United States Patent
Balloga

(10) Patent No.: US 8,868,342 B2
(45) Date of Patent: Oct. 21, 2014

(54) ORIENTATION DEVICE AND METHOD

(76) Inventor: Abram L. Balloga, Philadelphia, PA (US)

(*) Notice: Subject to any disclaimer, the term of this patent is extended or adjusted under 35 U.S.C. 154(b) by 601 days.

(21) Appl. No.: 13/213,492

(22) Filed: Aug. 19, 2011

(65) Prior Publication Data

US 2013/0046461 A1 Feb. 21, 2013

Related U.S. Application Data

(63) Continuation-in-part of application No. 13/211,451, filed on Aug. 17, 2011, now abandoned.

(51) Int. Cl.
| | | |
|---|---|---|
| G01C 21/00 | (2006.01) | |
| G01C 3/04 | (2006.01) | |
| H01S 3/00 | (2006.01) | |
| G01C 21/20 | (2006.01) | |
| G01S 7/497 | (2006.01) | |

(52) U.S. Cl.
CPC G01C 21/20 (2013.01); G01C 3/04 (2013.01); G01S 7/4972 (2013.01)
USPC .................. 701/491; 701/438; 356/8; 359/428

(58) Field of Classification Search
CPC ............ G01C 21/20; G01C 3/00; G01C 3/04; G01C 3/005; G01C 3/10–3/32; F41G 3/06; F41G 3/08; F41G 3/02; F41G 1/473; A63B 2220/18; G02B 23/10
USPC ................ 701/409, 431, 438, 454–460, 491; 340/539.2, 990, 995.1–995.28; 342/52–54; 356/8; 359/428, 362, 399, 359/407, 424; 42/114, 115, 117, 142
See application file for complete search history.

(56) References Cited

U.S. PATENT DOCUMENTS

2008/0290164 A1* 11/2008 Papale et al. .................. 235/414
2011/0021293 A1* 1/2011 York et al. ..................... 473/407

OTHER PUBLICATIONS

Tom Clark, How a GPS Receiver Gets a Lock, Jun. 11, 2010, courtesy of Internet Wayback Archive.*
Leica Geovid HD Laser Rangefinder Binoculars, Internet Wayback Archive, Dec. 11, 2010.*
Bushnell Backtrack GPS Navigation System, Binoculars.com, Internet Wayback Archive, Jun. 25, 2010.*

* cited by examiner

*Primary Examiner* — Khoi Tran
*Assistant Examiner* — Abby Lin
(74) *Attorney, Agent, or Firm* — Brown & Michaels, PC

(57) ABSTRACT

A method and device for streamlining navigation from a point to a visual point of interest by combining the necessary items into a single device incorporating an optical finder such as binoculars which incorporates an optical display into the viewfinder, a rangefinder, GPS, compass, altimeter, inclinometer, microprocessor and memory. The device performs three functions: 1) acquires the POI's coordinates relative to the user by visual indication of the POI by the user; 2) reproduces an updated POI vector on demand; and 3) displays the POI vector information in the device viewfinder. All three functions happen seamlessly and instantaneously with the use of only one compact hand held device.

18 Claims, 19 Drawing Sheets

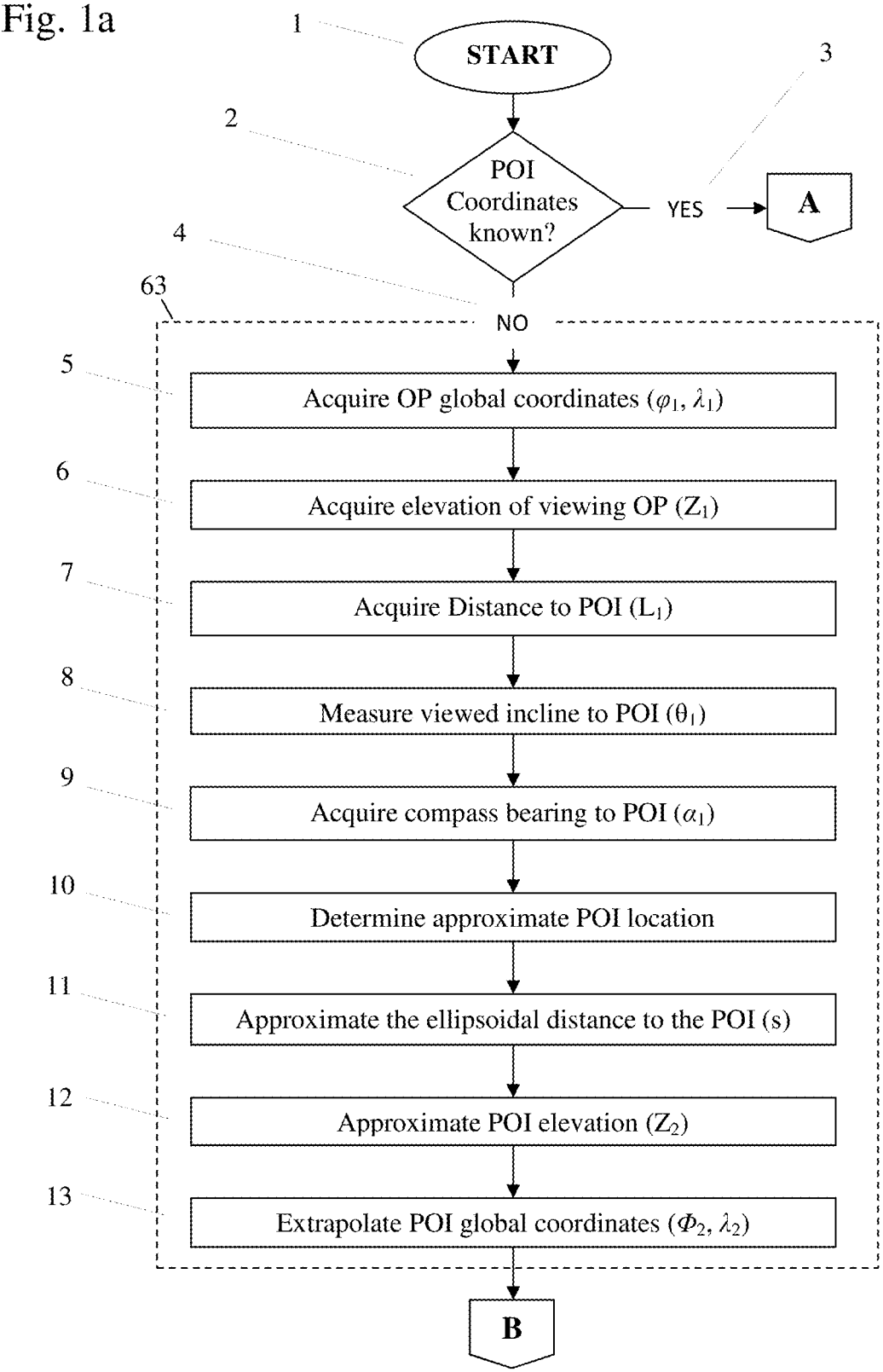

Fig. 10 (Vertical Plane)
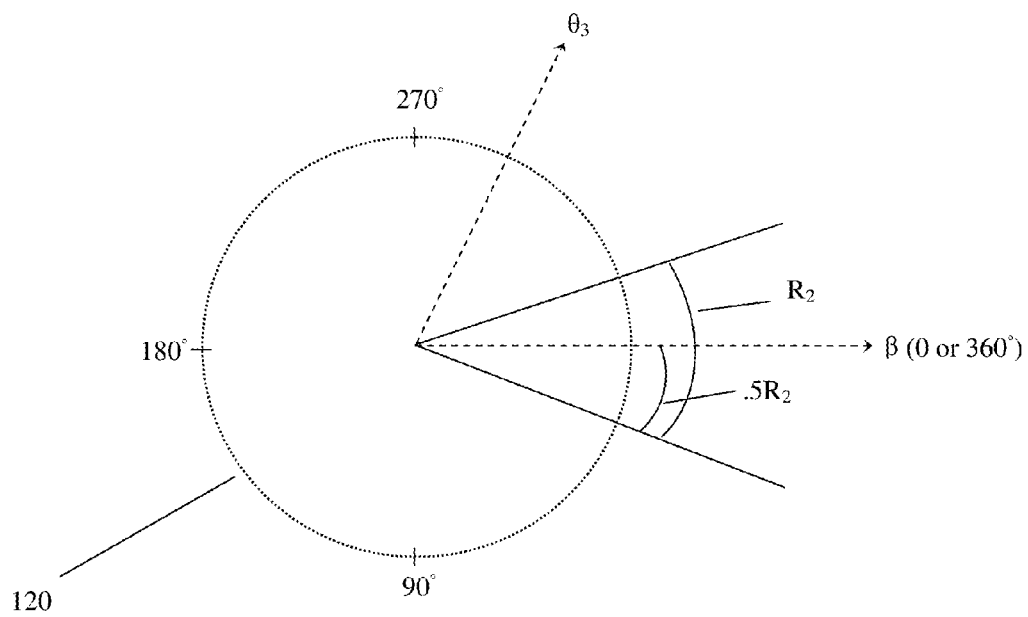
Fig. 11
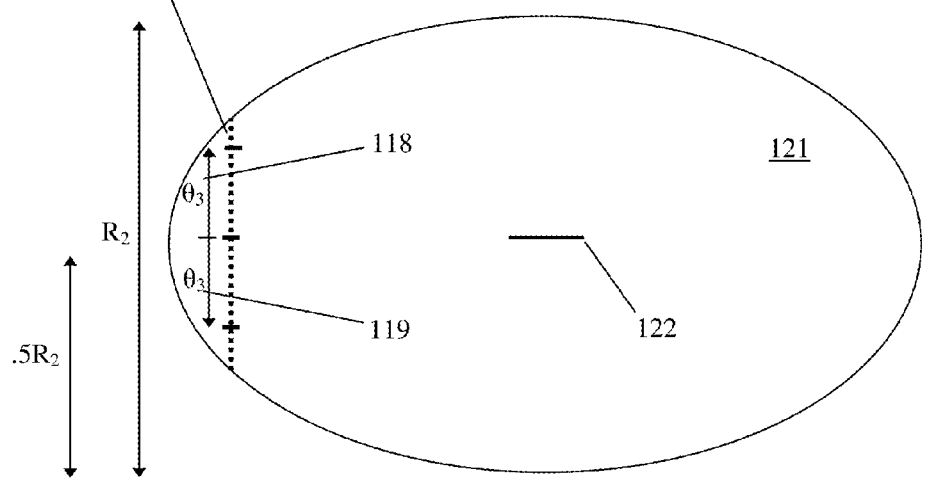

ORIENTATION DEVICE AND METHOD

REFERENCE TO RELATED APPLICATIONS

This is a continuation-in-part of co-pending patent application Ser. No. 13/211,451, filed Aug. 17, 2011, entitled "ORIENTATION DEVICE AND METHOD". The aforementioned application is hereby incorporated herein by reference.

BACKGROUND OF THE INVENTION

1. Field of the Invention

The field of this disclosure relates to methods and systems for maintaining visual orientation relative to a point of interest and to a rangefinding GPS system for implementing such methods advantageously and strategically during wilderness maneuvers.

2. Description of Related Art

Navigating to a position of interest after having lost visual contact with your destination has long been a problem. While maps and compasses are well-known and very old technology, following a compass on a cross-country course once the way becomes obstructed by trees, fences, etc., requires a great deal of skill and practice.

For example, if you find yourself in an unfamiliar wilderness setting and must walk to some (previously) visually acquired distant point, it is quite easy to lose your way, even for experienced outdoorsmen. Unavoidably, as you move, the surroundings change and direct visual contact with your destination is obstructed, as well as original landmarks and other visual points of reference. Before long, you can no longer see the point of interest (POI) to which you plan to travel, and begin to lose most or all visually guiding mechanisms, becoming increasingly disoriented to your path. If unable to regain your bearings, you must walk back to the original vantage point and re-scout the surroundings, costing much time and effort. There are countless scenarios, particularly for military, hunters, biologists, and other outdoor enthusiasts, for whom this type of disorientation frequently occurs, to the great disadvantage of their objective.

It is possible to use a position-measuring and navigation device such as a Global Positioning System (GPS) receiver to determine where you are when you start navigation, and it is possible to set in a destination point in the GPS if you know the destination by its geographical coordinates (latitude/longitude) or some identifying information such as a name or address (assuming the GPS has such names or addresses in a database). Some devices allow entering the location of a destination by specifying a horizontal offset from a known location—for example, aviation GPS units commonly allow specifying a point as "8 miles on a bearing of 135° from the Ithaca airport" or the like. However, these methods are not of much use in navigating from a known start point to a visual POI, as it is not possible in prior-art navigation systems to set in a destination visually by pointing at something and specifying, "I wish to go there."

Determining the bearing and distance to a visual POI has been done by traditional surveying techniques. For example, tripod mounted surveying instruments such as transits and inclinometers could be used to measure bearing and elevation angle. Cross-bearings could be taken from two known locations, and calculations done to triangulate a POI. However, the weight and bulk of such devices make them unsuitable for assisting outdoorsmen who require minimal weight and bulk specifications of their equipment—otherwise their goals are compromised, if not made impossible—and even knowing that your POI is on a bearing of 135° horizontally (or magnetic) and 10° up would not help much once you left your starting point.

Rangefinding binoculars exist, such as those manufactured by Zeiss, Bushnell or Leupold. These use lasers to determine range to a point and, in some cases, inclination. They are very expensive, and are marketed to hunters so that they can correct their rifles for distance. Further, knowing the range and inclination from your starting point to the POI does not help much with navigation once you leave the starting point and lose sight of the destination in the woods.

Ballistic algorithms are also seen in a more advanced version of this technology, which calculate a ballistic trajectory rather than only a distance, both of which are displayed in the device's optoelectronic viewfinder. U.S. Pat. No. 7,690,145 "Ballistic Ranging Methods And Systems For Inclined Shooting" describes a method for shooting a projectile weapon by determining the inclination of a line of sight from a vantage point to a target and a line-of-sight range to the target, then predicting a trajectory parameter at the line-of-sight range, for a preselected projectile.

While a combination of prior art technology could be used to precisely locate a POI—at a minimum, this would require a range finding binocular, a handheld GPS, a mobile calculating device, and a compass with aiming device, along with a great deal of complex mathematics and knowledge on the part of the user. Once done, the process, if it is to achieve a high level of accuracy, is imprecise, impractical, extremely time consuming, and involves multiple devices which must be interchanged, and possibly unpacked and repacked in the user's gear.

Relevant U.S. patents to the field include the following:

U.S. Pat. No. 5,825,480 "Observing Apparatus", superimposes topographic maps in a visual display which obstructs the vision of the user. The method requires topographic information to determine and display a POI. In areas or situations where said topographic information is scarce or inaccurate, the method fails in desired accuracy.

U.S. Pat. No. 6,233,094 "Telescope Utilizing Global Positioning System (GPS)", calculates a vector between two devices and does not extrapolate POI coordinates. An external device must physically travel to the spot and record its coordinates before the device may be functional. This invention can only orient a user to a location first provided to it from an outside source.

U.S. Pat. No. 7,107,179 "Passive Target Data Acquisition Method And System" transmits targeting information to remote command centers and weapons systems.

U.S. Pat. No. 7,271,954 "Binoculars With An Integrated Laser Rangefinder" is directed primarily to the mechanical details of combining binoculars with a laser rangefinder. The '954 patent mentions including "further electronic measuring devices" such as a GPS, inclinometer, altimeter or compass in the binocular battery compartment, but does not teach or suggest using such devices in combination with the laser rangefinder to provide land navigation to a POI.

U.S. Pat. No. 7,643,054 "Directed Guidance Of Viewing Devices", is intended for use in something like a guided tour, where a multitude of devices are synced to known locations. This system requires preprogrammed and known points in order to operate, and its lack of improvisational capabilities make it unsuitable for a wilderness setting.

U.S. Pat. No. 7,908,083 "System And Method For Recording A Note With Location Information Derived From Rangefinding And/Or Observer Position", can be used in the field to determine the location of a distant point and record its coordinates along with user inputted "notes" of information to later be pulled from the device and analyzed on a computer. This invention can display the distance and bearing to the desired POI at the point where it is first used. However it requires that a direct line of sight be established in order to do so. After the user has moved and potentially maneuvered with respect to a recorded POI, if the user no longer has direct visual contact with the POI, the user cannot use this method to orient themselves.

SUMMARY OF THE INVENTION

The invention streamlines the process of navigation from a starting point to a visual point of interest by combining the necessary items into a single device incorporating an optical finder such as binoculars which incorporates an optical display into the optical device's viewfinder, a rangefinder, GPS, compass, altimeter, inclinometer, microprocessor and memory. The device performs three functions: 1) acquires the POI's coordinates relative to the user by visual indication of the POI by the user; 2) reproduces an updated POI vector on demand; and 3) displays the POI vector information in the device viewfinder. All three functions happen seamlessly and instantaneously with the use of only one compact hand held device.

The invention also provides a method of personal orientation in a wilderness or unfamiliar setting using a device determining the coordinates of current user position in three-dimensional space, or Origination Point (OP), and then acquiring the coordinates of a Point of Interest (POI). Information to determine global coordinates include longitude, latitude and elevation—which the device discovers directly with embodied instruments or extrapolates using inclination, distance, and compass bearing to the POI. OP and POI coordinates are acquired either by the device itself or can be inputted by supplementary devices. While maneuvering, the user calculates updated vectors to a POI from various positions and maintains relative position orientation with respect to one or multiple POIs. The POI vector information is displayed in the device viewfinder, providing visual orientation for improved knowledge of relative position and enabling accurate landmark acquisition for successfully traversing a landscape to the destination position. The method may be embodied in a handheld laser rangefinding binocular including memory for storing acquired position data and a computer processor for performing calculations.

BRIEF DESCRIPTION OF THE DRAWING

FIGS. 1a-1f collectively form a flowchart of the method of the invention.

FIG. 10 shows a side view diagram of how the POI vector inclination information is considered in the method for orientation purposes.

FIG. 11 shows a view through a viewfinder of the POI vector incline information is considered for coordinating use of pointing indicators.

DETAILED DESCRIPTION OF THE INVENTION

The invention electronically records global coordinates of a Point of Interest relative to the point of origin, and allowing this data to be stored and referenced throughout a journey. On a dark or moonless night or through a valley of fog, with this system, a user is able to walk directly from the OP to the point of interest without losing their bearing. Such ability is valuable both for convenience and safety purposes. Furthermore, the ability to record an exact location without first traversing to the position and recording its coordinates is equally valuable, among the many practical applications of these systems and methods.

The concept at work here is to greatly and seamlessly improve user visual orientation. The circumstances by which this invention was conceived brought this point to attention. Outdoorsmen of many kinds heavily rely on optics such as binoculars to make observations creating a tactical plan based on the lay of the land to achieve their goal. As users move, they continuously use optics to check progress and re-orient themselves visually, often with the aid of a handheld GPS device. Current GPS configurations require users to look first down at the GPS in their hand to gather a heading, and then must look up and project, by user judgment alone, the bearing vector against the background environment. Then, when the user has estimated how the bearing vector lays against the landscape, the user must resume optics to further scout the vector and incorporate this new information into their observation and strategy. The process is imprecise, impractical, and involves multiple devices which must be interchanged, and possibly unpacked and repacked in the user's gear. The invention disclosed streamlines the above process and items into a single device, and eliminates the human error involved in guessing how a GPS derived bearing would extend against a distant mountainside for landmark designation.

Figure 5A:
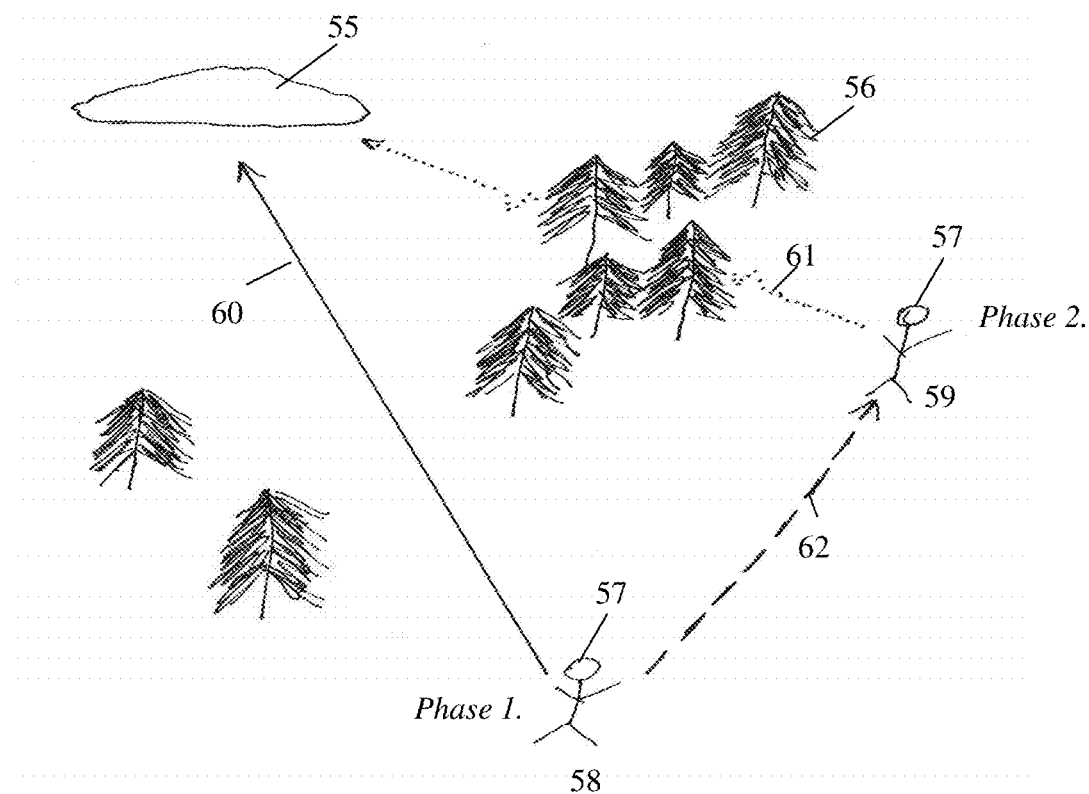
FIG. 5a shows a user moving with respect to a POI.

FIG. 5a illustrates an overhead view of the movement of a user 57 with respect to a POI 55, in this case a rock. In phase 1 the user 57, in position 58, has a visual line of sight 60 to the POI 55. He visually acquires the POI 55 and begins the method of the invention, to be described in detail below. He proceeds along path 62 toward position 59. As he approached position 59, in Phase 2, the user 57 loses orientation with respect to the POI 55—trees 56 block the line of sight 61 to the POI 55 as well as other crucial landmarks. The user 57 continues implementation of the method to construct an updated POI vector, and regains visual orientation.

Figure 12:
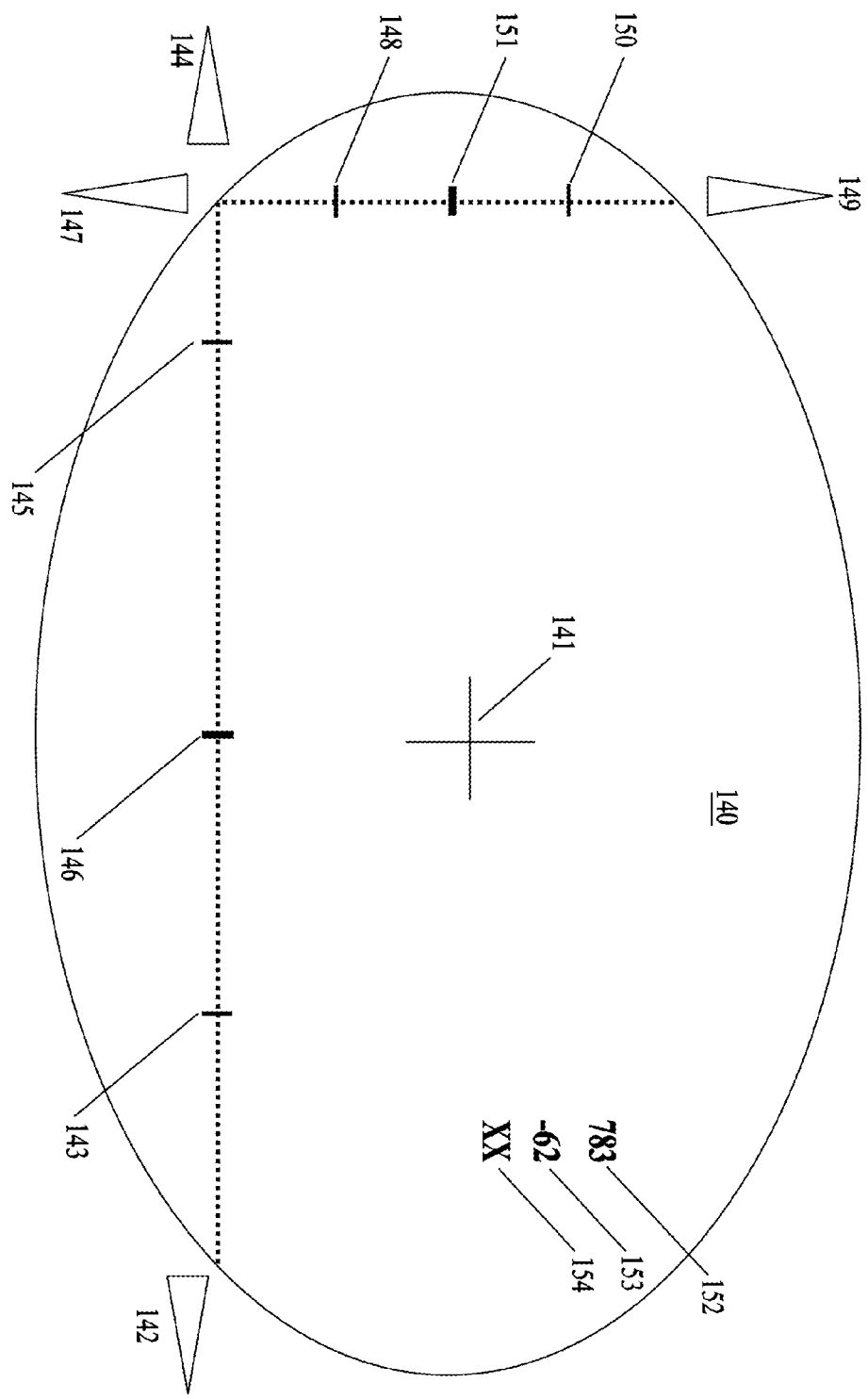
FIG. 12 shows the different indicators with which the user interacts with the system and environment through the viewfinder.
Figure 13A:
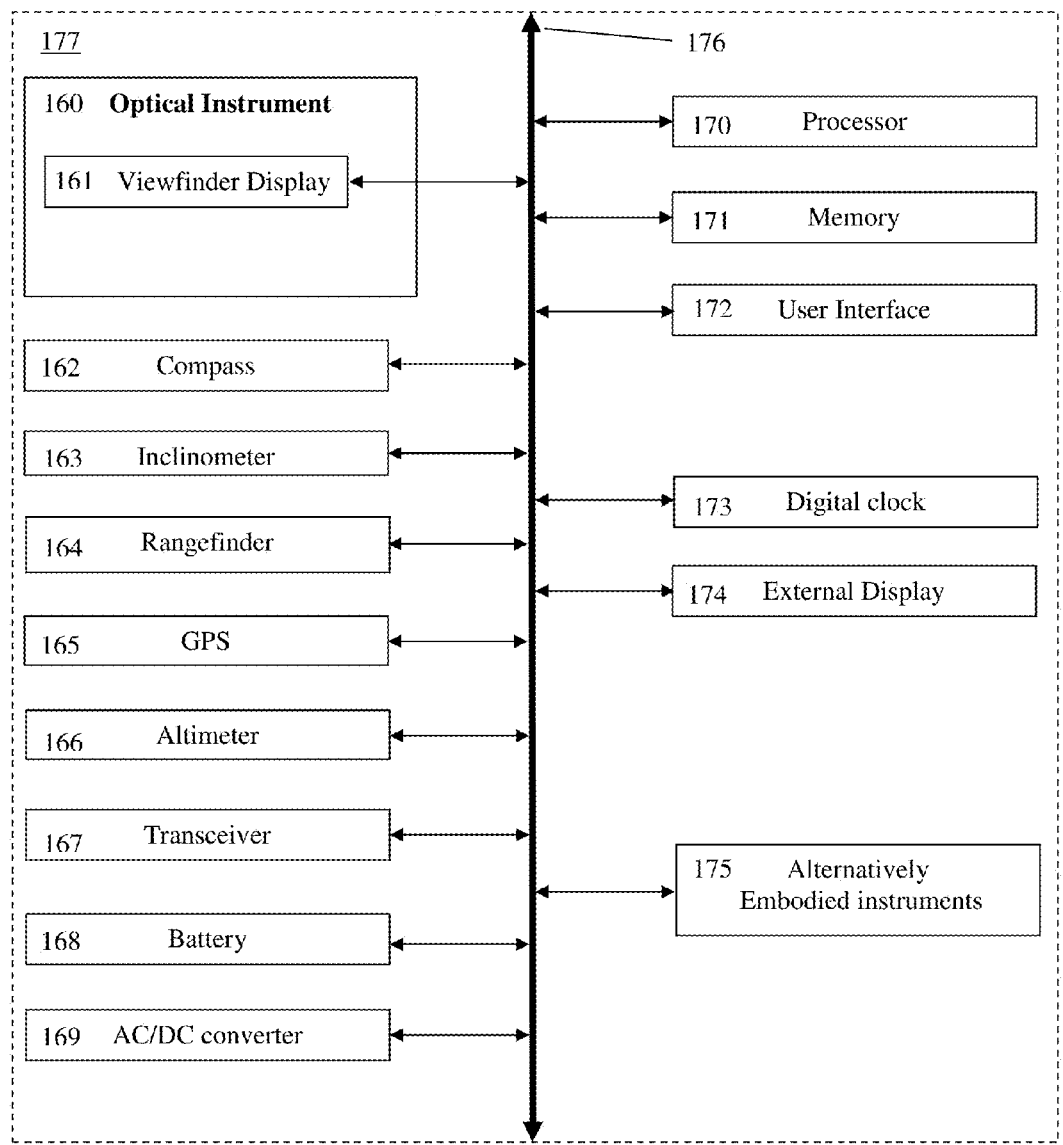
FIG. 13a shows a block diagram of the device instruments and architecture.

FIG. 12 shows the outputs of the method as the user sees them displayed in the device viewfinder 140 (or 161 in FIG. 13a). The reticule 141 represents the center of the viewing axis and is used to aim the device for POI designation. Indicators 142-146 alert the user as to their orientation in the horizontal plane. Similarly, indicators 147-151 point the user toward visual orientation in the vertical plane.

For each POI, only one indicator from each the horizontal and vertical indicator groups is activated at any given time, and transition between indicators reflects the users progress toward visual orientation by following previous indicators. The distance, or magnitude of the POI vector, 152 is shown in the upper right of the display. Also shown is the elevation differential 153, the difference between the user's elevation and that of the POI. A multitude of alternative information 154 may also be displayed alongside that for basic visual orientation.

FIG. 13a is a block diagram exemplifying one potential architecture of the system. In this example all instruments, modules and components 160-175 are encased together into one device housing 177; although in alternative forms, the invented system may be successfully implemented by a myriad of separate devices working together, so long as they are able to communicate as required and carry out the system functions. The electronic elements of the device are connected via the circuitry 176 depicted by the network of arrowed lines showing the flow of power and information.

The optical instrument 160 could be implemented as binoculars, monocular, telescope, goggles or glasses. The optics of the optical instrument define the viewing vector along which light from an image passes through the instrument to the user.

Integrated into the optical instrument 160 is the viewfinder display 161, an optoelectronic module which is clear if not stimulated, or can be activated to show readouts on in the user's field of view associated with the viewing vector while looking through the binocular.

A computer processor 170 coordinates the actions of the system via an operating system and application code as well as processes information. The flow of commands and information from the other modules and devices will preferably pass through a plurality of inputs and at least one output of the processor 170. Computer memory module 171 records and catalogues information that is either been created by the method or that the method will require in its processes.

A compass 162 gathers azimuth (bearing) data with regard to the current orientation of the viewing vector, that is applied in extrapolating the POI vector. The azimuth data is provided at an output.

An inclinometer 163 is calibrated to zero where the viewing vector is level relative to gravity, and measures incline or decline of the device as it deviates from the leveled state. The data representing the inclination is provided at an output.

A rangefinder 164 having a laser for measuring distance to a target is arranged to point along the optical axis. The rangefinder is calibrated and coordinated with the viewfinder display 161 such that a reticule in the center of the viewfinder indicates the precise pointing of the laser, so that it is aimed by looking through the device. Thus, the user can indicate a target with the reticule and the rangefinder 164 will measure the distance to the target and provide data indicating the distance for further processing.

A GPS receiver module 165 provides global coordinates in longitude and latitude (lat/lon) of the current position of the receiver (i.e. of the device and the user). The lat/lon coordinates are provided at an output.

An altimeter 166 may be included to measure the user's elevation above sea level. This data may be used in critical analytical steps to ensure the accuracy and precision of the method. Altitude data would be provided at an output.

Optionally, a transceiver module 167 enables the system to both receive and send information, this might include POI information, waypoint coordinates, or other data collected for or during the method implementation. The ability to share information remotely is desirable in a wilderness setting. The transceiver 167 would have an input and output for data flow.

A battery 168 supplies electrical energy to the system so that the circuit components may operate, although a secondary option involves plugging into a stationary power source through an AC/DC converter (adapter) 169, which protects the circuitry and also recharges the battery 168.

User interface 172 allows the user to activate the device and command the system throughout the method steps—external buttons or voice recognition controls may be employed. The user interface would have inputs and outputs coupled to the processor 170 as needed.

Digital clock 173 may be used to time stamp recorded data, so that a specific time is allocated to each POI acquired, or way point achieved, etc. This assists in cataloguing and organization of data for analysis. The digital clock may be built into the processor 170, or a separate module having an output coupled to an input of the processor 170 for passing time stamp data to the processor 170. Alternatively, time data can be derived from the GPS signal and provided to the processor by the GPS receiver 165.

External display 174 might be employed to assist with user interfacing and management of data inputted and outputted from the method.

Optionally, additional instruments 175 can be built into the device, possibly including environmental condition sensors such as humidity, barometric pressure or temperature gauges, or other instruments that may provide useful information during data collection and navigation via the invented method.

Figure 13B:
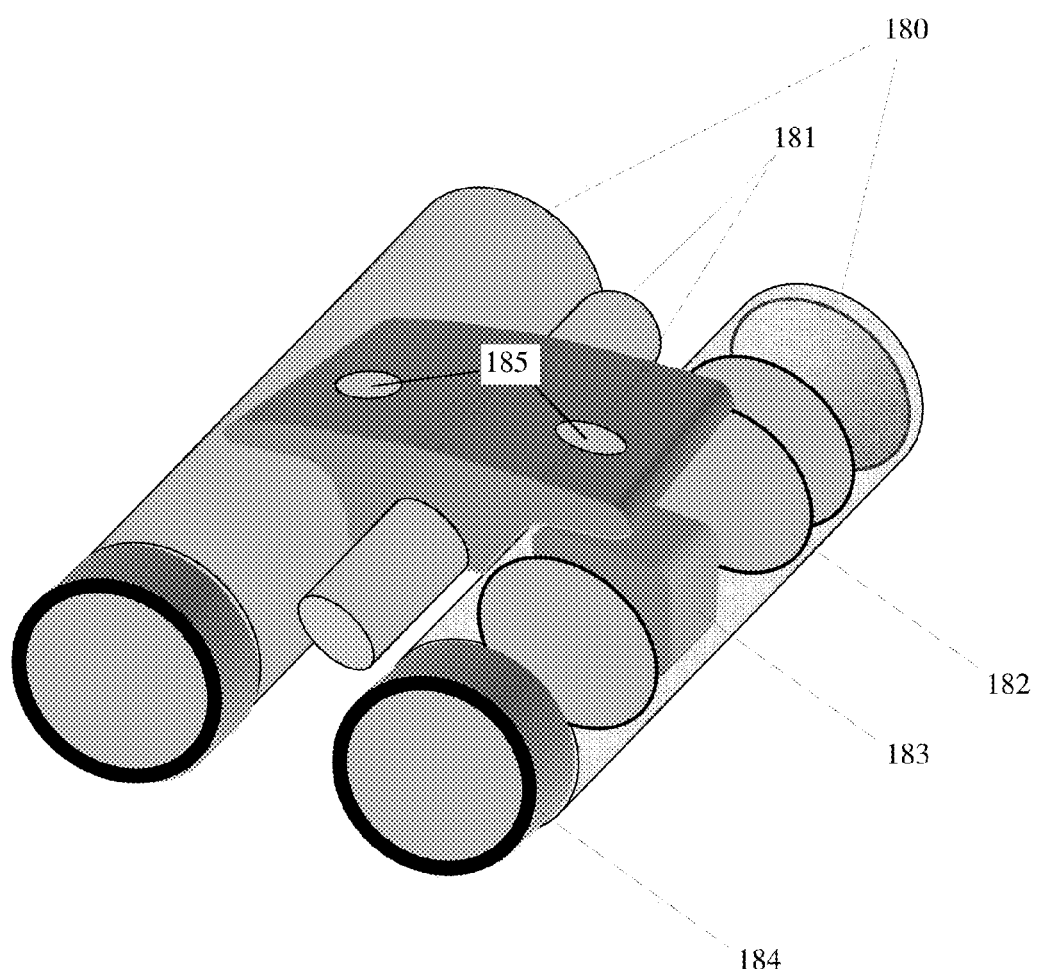
FIG. 13b shows a three-dimensional view of the preferred form of the device.

FIG. 13b shows a three-dimensional depiction of one possible system device embodiment. Pictured is a basic pair of binoculars, the optical instrument 160, with two optical tubes 180 containing the necessary lenses and prisms 182 for an optical instrument, as well as eyepieces 184 where the user looks into the viewfinder.

Most of the electronic components are arranged apart from the optics in separate compartments 181—this might include compass 162, inclinometer 163, rangefinder 164, GPS module 165, altimeter 166, transceiver 167, battery 168, AC/DC converter 169, computer processor 170, memory modules 171, additional instruments 175, as well as interconnecting circuitry 176. Components of the right hand optical tub are exposed to show the Viewfinder Display 183 (161) nestled within the optical components so that it will be seen while looking through the device. Buttons 185 allow the user to interface 172 with the device.

Figure 13C:
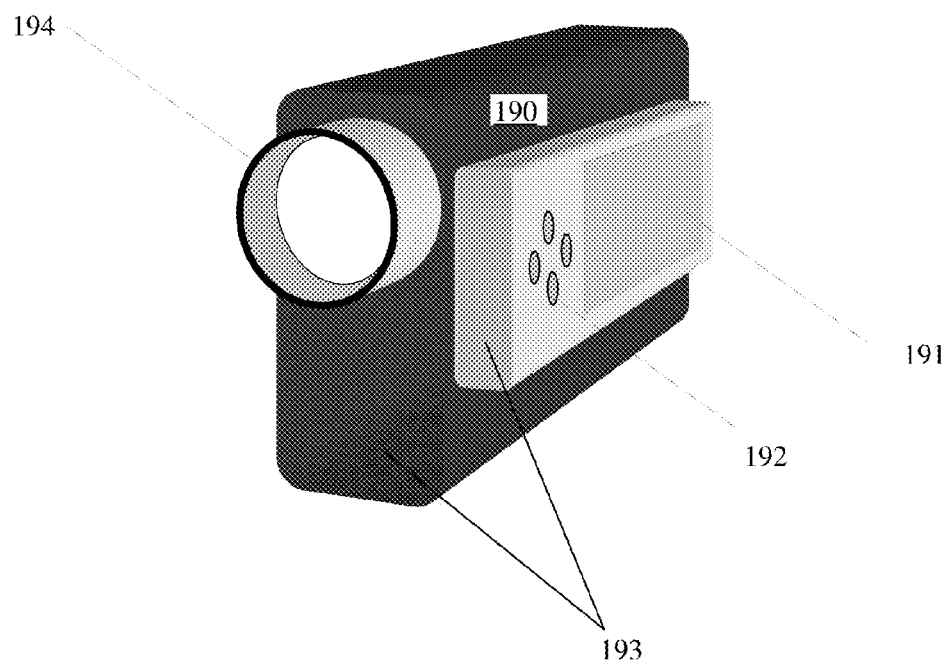
FIG. 13c shows a three-dimensional view of one of the many alternatively embodied devices that can implement the invented system & method.

FIG. 13c shows a three-dimensional depiction of an alternative embodiment. In this case, the optical instrument 160 comprises a rangefinding monocular 190 containing all of the necessary optical components. Just as in FIG. 13b, the electronic components are segregated from the ocular tube into surrounding compartmental spaces 193, the viewfinder display is integrated into the monocular (not illustrated, see 183), and external buttons 192 allow the user to interface with the device. The distinguishing feature of this alternative embodiment is the addition of an external display 191 (174), possibly touch screen, which allows for increased versatility and interfacing options such as ease of POI and waypoint management.

One practical example of this involves the use of device shown in FIG. 13c for orientation purposes on a golf course. The inclusion of an external display allows the golfer to have at his or her disposal both an overhead map view of the hole in question on which POI's can be selected and analyzed as well as a heads up viewfinder perspective of the same information. The POI may be selected, modified, and viewed via either of the two options, as the two share information directly. In a forward orientation process, the golfer can acquire a POI with the rangefinder by looking through the device, and then observe on the external display where that point lies with respect to the target hole for further analysis. If this analysis reveals that adjustments to the POI via the external display will further optimize the golfer's strategy, then he or she can make the necessary adjustments before observing the new POI vector through the viewfinder for confirmation. Alternatively, in a reverse process, the golfer can select a point on the externally displayed map as a waypoint target enroute to the hole, and then observe along the vector to the waypoint POI through the viewfinder. Should a sand trap or other obstruction, not disclosed on the map, be found to lie in this path that the shot must follow, the golfer can then adjust by selecting an alternative POI through the viewfinder that will skirt the obstacle, before re-visiting the external display for further analysis of the effects of this adjustment on the future strategic plan.

Figure 4:
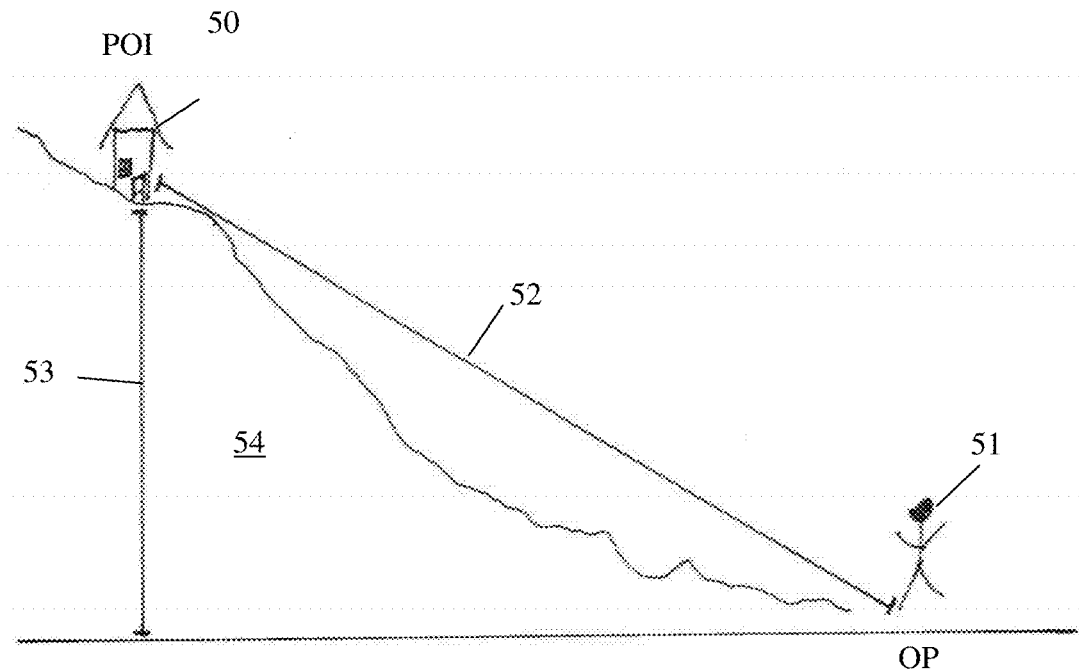
FIG. 4 shows an example of a user and a POI.

FIG. 4 shows a schematic view of the real-world setup which will be diagrammed in the context of the method below in FIGS. 6-12. The user 51 is at the Origination Point OP, looking up hill 54 at an Alpine shepherd's but 50 to which he would like to hike, and which forms the Point of Interest POI. The hut 50 is at a higher elevation 53 relative to the OP. The direct line distance 52 from the OP to the POI leads upward at a slope.

FIGS. 1a-1f collectively form a flowchart of the method of the invention. The method starts in FIG. 1a, then flows by connectors A or B to FIG. 1b, from where subroutines (shown in FIGS. 1d-f) depart and then return to the same page—then the method flows through connector D back to FIG. 1b to complete the loop. Where appropriate, the steps will refer to the diagrams and displays of FIGS. 6-12.

Figure 1B:
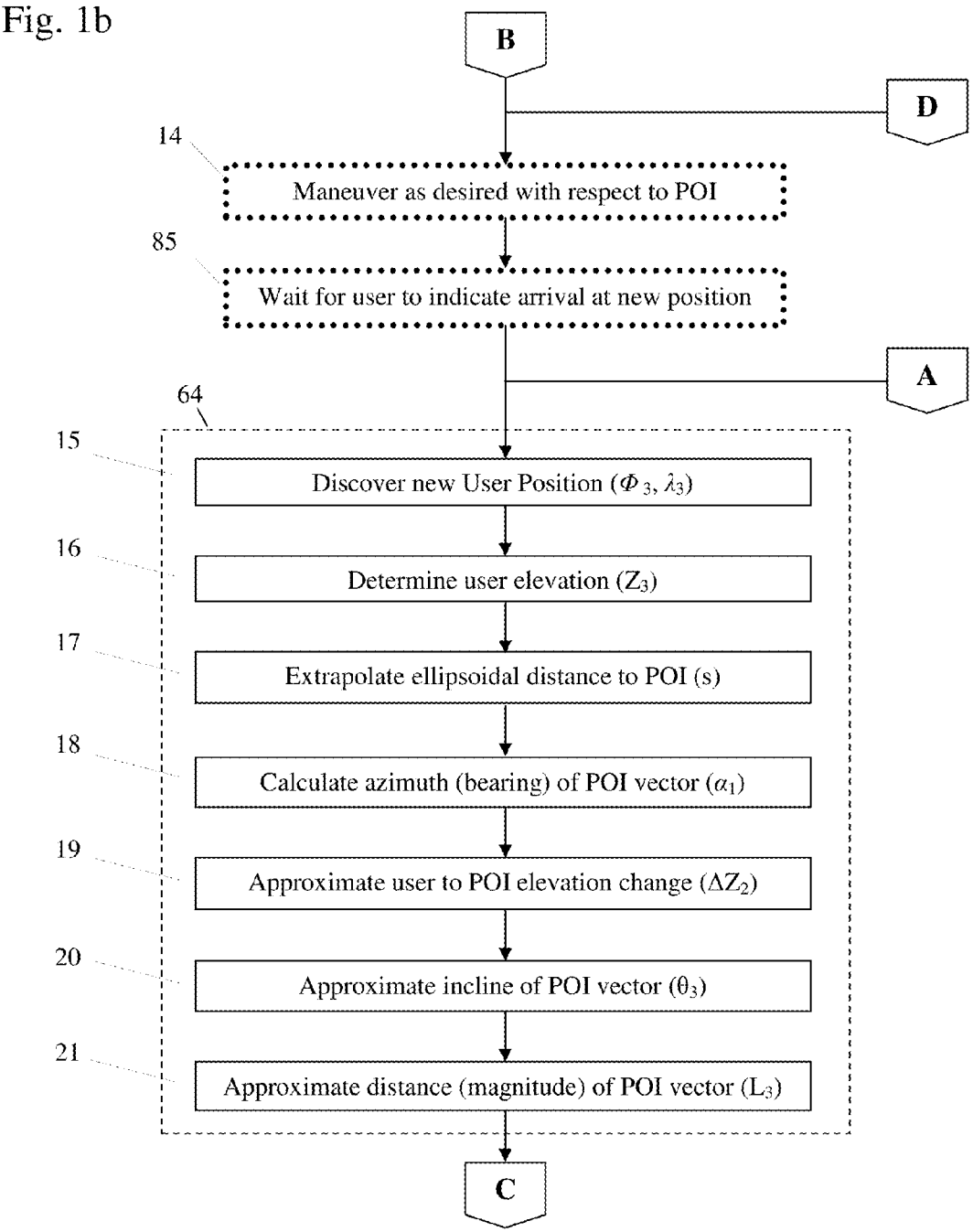
Figure 1C:
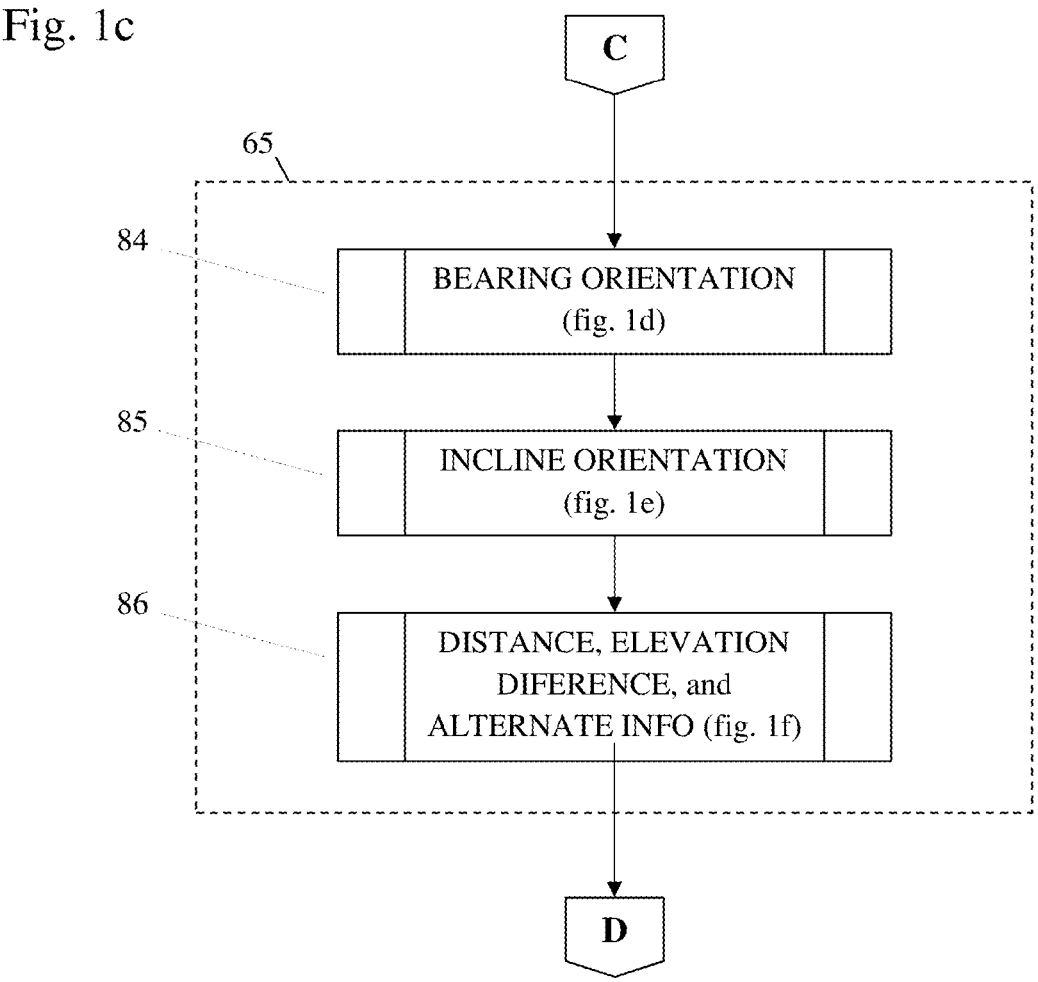
Figure 1D:
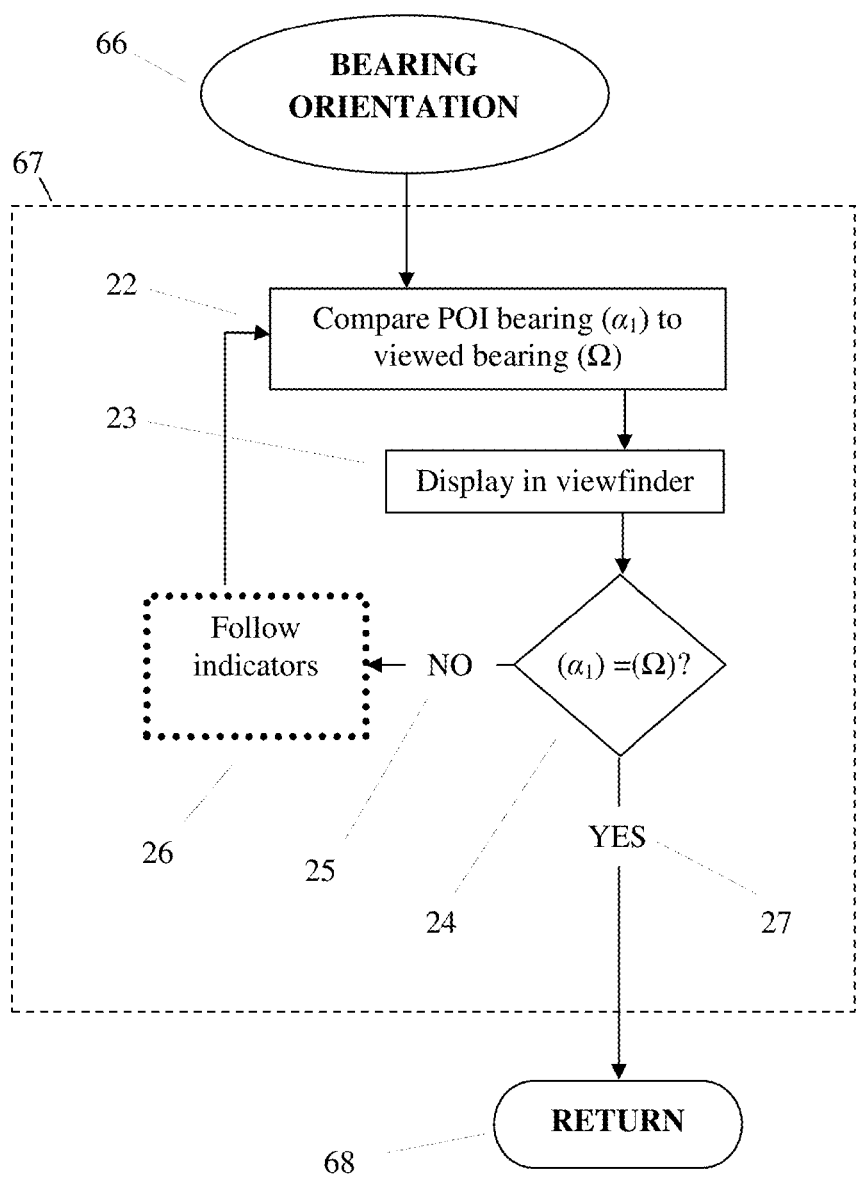
Figure 1E:
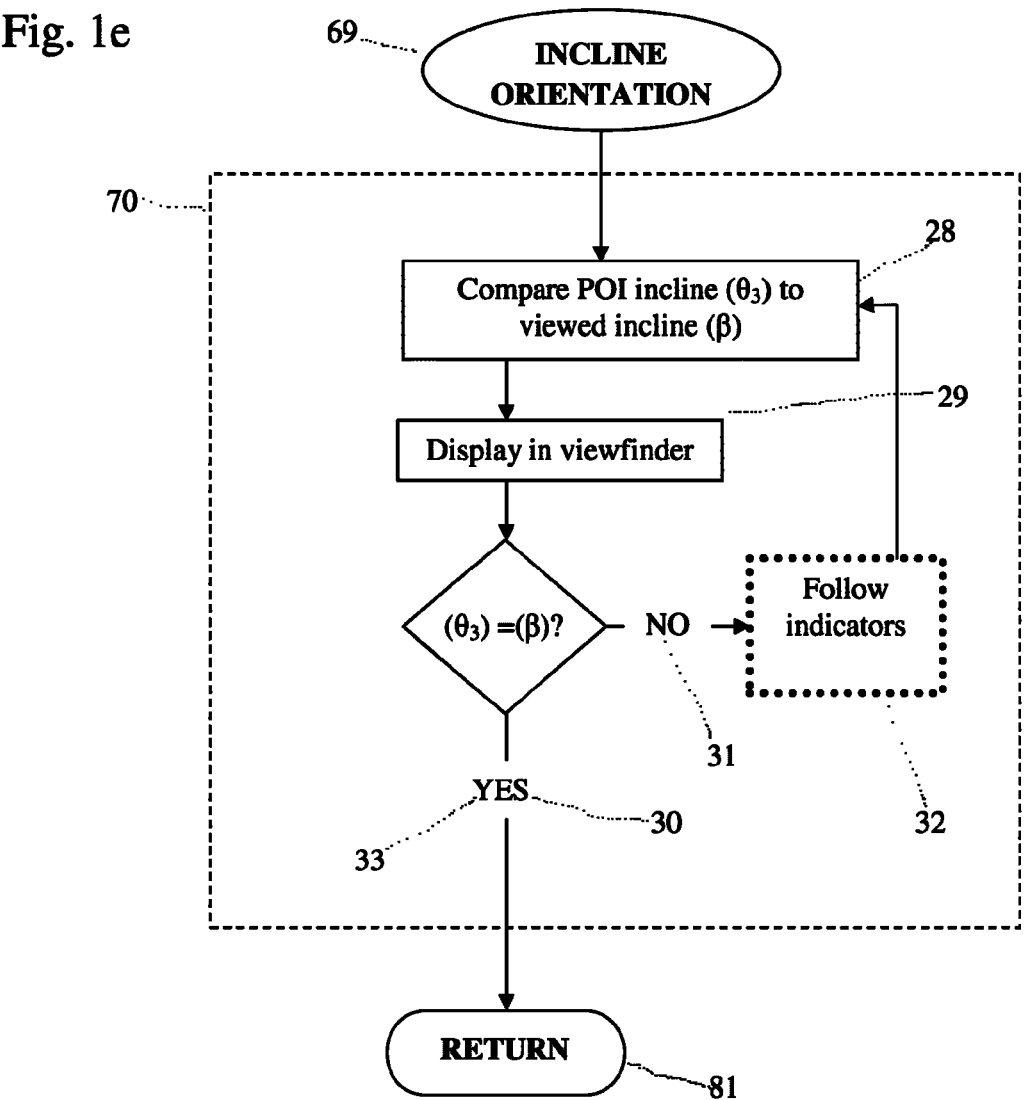
Figure 1F:
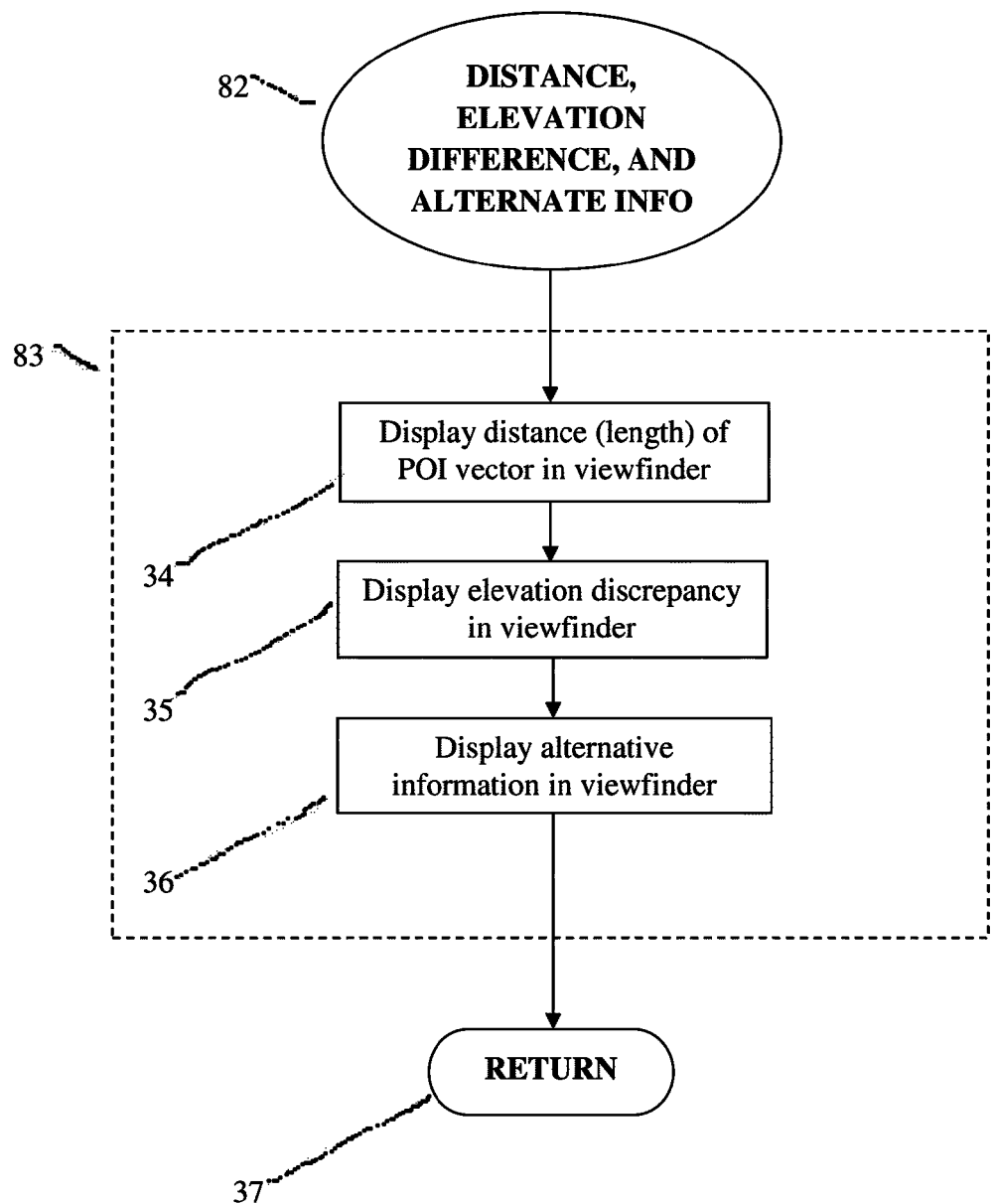

The steps in the method are as follows:
1. The method starts.
2. Are the coordinates of the POI known?
    3. If the coordinates of the POI are known, skip ahead (connector A) to step 15 (FIG. 1b). Known coordinates include those acquired first-hand on previous excursions, or received wirelessly from another source.
    4. If not, pass on to step 5.
63. The first step in the method is to designate a POI from an established OP. This overall step is indicated by the dashed line 63 in FIG. 1a, and a diagram of the elements found can be seen in FIG. 6.
5. Acquire the Origination Point (OP)—The GPS receiver 165 in the device is activated and acquires the global coordinates of the OP, or user position when POI is designated. The OP coordinates $(\Phi_1, \lambda_1)$ are recorded in the computer memory module 171.
6. Acquire the OP elevation—An altimeter 166 can be read to acquire user elevation $(Z_1)$ above sea level, or the information can be derived from the GPS 165. User elevation $(Z_1)$ is recorded in the computer memory module 171.
7. Acquire the distance between the OP and POI—The rangefinder 164 is activated and acquires the distance $(L_1)$ from the OP to the POI (or magnitude of the POI vector). The distance $(L_1)$ is recorded in the computer memory module 171.
8. Measure the Viewed Incline—the inclinometer 163 is activated and acquires the inclination bearing above or below the horizon. The incline $(\theta_1)$ is recorded in the computer memory module 171.
9. Acquire the compass bearing—the embodied compass 162 is activated and acquires the horizontal bearing, or forward azimuth, from the OP to the POI. The forward azimuth $(\alpha_1)$ is recorded in the computer memory module.
10. With the above information simultaneously captured and stored, the next step in the method is to determine the location of the POI. The computer processor 170 via software programs accesses the computer memory 171 to withdraw the needed information and performs the following:
11. Approximate the ellipsoidal distance to POI (See FIG. 6)—using simple trigonometry of a right triangle having hypotenuse $L_1$, and inclination angle $\theta_1$, the adjacent side (s) represents an approximation of the arc length across earth's curvature between the OP and POI global coordinates.

Evaluate: $\cos(\theta_1) = s/L_1 \rightarrow s = L_1 * \cos(\theta_1)$

Approximated ellipsoidal distance (s) is recorded in the computer memory 171.

12. Derive approximate POI elevation—An approximation of POI elevation $(Z_2)$ can be determined by adding the difference in OP & POI elevation $(\Delta Z_1)$ to known OP elevation $(Z_1)$.

Evaluate: $\cos(\theta_1) = |\Delta Z_1|/L_1 \rightarrow |\Delta Z_1| = L_1 * \cos(\theta_1)$ $Z_2 = \Delta Z_1 + Z_1$ Approximated POI elevation $(Z_2)$ is recorded in the computer memory 171.

13. Extrapolate the POI coordinates—ellipsoidal distance (s), compass bearing or forward azimuth $(\alpha_1)$, and OP coordinates $(\phi_1, \lambda_1)$ are input into appropriate geodesic formulae such as Vincenty's Direct Method. Given an initial point $(\Phi_1, \lambda_1)$ and initial azimuth, $\alpha_1$, and a distance, s, along the geodesic the Vincenty direct method finds the end point $(\Phi_2, \lambda_2)$ and azimuth, $\alpha_2$ by the steps of:

Start by calculating the following:

$$\tan U_1 = (1 - f)\tan\phi_1$$

$$\sigma_1 = \arctan\left(\frac{\tan U_1}{\cos\alpha_1}\right)$$

$$\sin\alpha = \cos U_1 \sin\alpha_1;$$

$$\cos^2\alpha = (1 - \sin\alpha)(1 + \sin\alpha)$$

$$u^2 = \cos^2\alpha \frac{a^2 - b^2}{b^2}$$

$$A = 1 + \frac{u^2}{16384}\{4096 + u^2[-768 + u^2(320 - 175u^2)]\}$$

$$B = \frac{u^2}{1024}\{256 + u^2[-128 + u^2(74 - 47u^2)]\}$$

Then, using an initial value $$\sigma = \frac{s}{bA},$$

iterate the following equations until there is no significant change in σ:

$$2\sigma_m = 2\sigma_1 + \sigma$$

$$\Delta\sigma = B\sin\sigma\left\{\cos(2\sigma_m) + \frac{1}{4}B\left[\cos\sigma(-1 + 2\cos^2(2\sigma_m)) - \frac{1}{6}B\cos(2\sigma_m)(-3 + 4\sin^2\sigma)(-3 + 4\cos^2(2\sigma_m))\right]\right\}$$

$$\sigma = \frac{s}{bA} + \Delta\sigma$$

Once σ is obtained to sufficient accuracy evaluate:

$$\phi_2 = \arctan\left(\frac{\sin U_1 \cos\sigma + \cos U_1 \sin\sigma\cos\alpha_1}{(1-f)\sqrt{\sin^2\alpha + (\sin U_1 \sin\sigma - \cos U_1 \cos\sigma\cos\alpha_1)^2}}\right)$$

$$\lambda = \arctan\left(\frac{\sin\sigma\sin\alpha_1}{\cos U_1 \cos\sigma - \sin U_1 \sin\sigma\cos\alpha_1}\right)$$

$$C = \frac{f}{16}\cos^2\alpha[4 + f(4 - 3\cos^2\alpha)]$$

$$L = \lambda - (1 - C)f\sin\alpha\{\sigma + C\sin\sigma[\cos(2\sigma_m) + C\cos\sigma(-1 + 2\cos^2(2\sigma_m))]\}$$

$$\alpha_2 = \arctan\left(\frac{\sin\alpha}{-\sin U_1 \sin\sigma + \cos U_1 \cos\sigma\cos\alpha_1}\right)$$

Where:
A is length of major axis of the ellipsoid (radius at equator) (6,378,137.0 m in WGS-84);
B is length of minor axis of the ellipsoid (radius at poles) (6,356,752.314 m in WGS-84);
f=(a–b)/a is the flattening of the ellipsoid (1/298.257223563 in WGS-84);
$\Phi_1$, $\Phi_2$ are the latitude of the points;
$U_1$=arctan [(1–f) tan $\Phi_1$] and $U_2$=arctan [(1–f) tan $\Phi_2$] are the reduced latitude;
$\lambda_1$, $\lambda_2$ are the longitude of the points;
L=$\lambda_2$–$\lambda_1$ is the difference in longitude;
$\alpha_1$, $\alpha_2$ are the forward and reverse azimuths;
α is the azimuth at the equator (i.e., the great circle/ellipse, or "arc path", the points are on); and
s is the ellipsoidal distance between the two points.
Outputs of forward process [POI coordinates ($\Phi_2$, $\lambda_2$) & reverse azimuth ($\alpha_2$)] are recorded and stored in the computer memory 171.

14. With the information stored from the steps above, the user now leaves his initial OP 58 and proceeds along his path 62, at some point losing visual contact and thus orientation with respect to the POI.

85. Once the user has decided it is time to re-orient to the surroundings, it is indicated that the new position has been reached, from where the subsequent method steps are performed.

64. The second step in the method is to extrapolate the vector to the POI from the new user position. This overall step is indicated by the dashed box 64 in FIG. 1b, and diagrams of the elements found can be seen in FIGS. 7, 8, and 10. Although these steps are diagrammed sequentially, they may be performed in out of the illustrated order. In creating an updated user→POI vector, the steps occur in parallel software processes. User position with respect to the POI is extrapolated thusly by again activating the device which accesses stored computer memory 171 and performs the following functions via software and the computer processor 170:

15. Discover the new user position—the GPS module 165 is activated to find the user global coordinates. The updated user position ($\Phi_3$, $\lambda_3$) is recorded in the computer memory 171.

16. Determine the new user elevation—the altimeter 166 is activated to determine user elevation above sea level, or the new elevation is retrieved from the GPS. Elevation ($Z_3$) is stored in the computer memory 171.

17. Extrapolate updated ellipsoidal distance (s) from OP to POI—the POI coordinates ($\Phi_2$, $\lambda_2$) and user position ($\Phi_3$, $\lambda_3$), are accessed in the computer memory 171 via the operating system and computer processor 170.

Software in the processor 170 uses these two data points ($\Phi_2$, $\lambda_2$) and ($\Phi_3$, $\lambda_3$) as inputs to find the arc length between the current user position and the POI. One successful method can be by the following calculation (Vincenty's Inverse Method), although a multitude of mathematical techniques can be employed to approximate the ellipsoidal distance:

Given the coordinates of the two points ($\Phi_2$, $\lambda_2$) and ($\Phi_3$, $\lambda_3$), the inverse method finds updated azimuths $\alpha_1$, $\alpha_2$ and the new ellipsoidal distance s. Evaluate:

Calculate $U_1$, $U_2$ and L, and set initial value of λ=L. Then iteratively evaluate the following equations until λ converges:

$$\sin\sigma = \sqrt{(\cos U_2 \sin\lambda)^2 + (\cos U_1 \sin U_2 - \sin U_1 \cos U_2 \cos\lambda)^2}$$

$$\cos\sigma = \sin U_1 \sin U_2 + \cos U_1 \cos U_2 \cos\lambda$$

$$\sigma = \arctan\frac{\sin\sigma}{\cos\sigma}$$

$$\sin\alpha = \frac{\cos U_1 \cos U_2 \sin\lambda}{\sin\sigma}$$

$$\cos^2\alpha = 1 - \sin^2\alpha$$

$$\cos(2\sigma_m) = \cos\sigma - \frac{2\sin U_1 \sin U_2}{\cos^2\alpha}$$

$$C = \frac{f}{16}\cos^2\alpha[4 + f(4 - 3\cos^2\alpha)]$$

$$\lambda = L + (1 - C)f\sin\alpha\{\sigma + C\sin\sigma[\cos(2\sigma_m) + C\cos\sigma(-1 + 2\cos^2(2\sigma_m))]\}$$

When λ has converged to the desired degree of accuracy ($10^{-12}$ corresponds to approximately 0.06 mm), evaluate the following:

$$u^2 = \cos^2\alpha\frac{a^2 - b^2}{b^2}$$

$$A = 1 + \frac{u^2}{16384}\{4096 + u^2[-768 + u^2(320 - 175u^2)]\}$$

$$B = \frac{u^2}{1024}\{256 + u^2[-128 + u^2(74 - 47u^2)]\}$$

$$\Delta\sigma = B\sin\sigma\left\{\cos(2\sigma_m) + \frac{1}{4}B\left[\cos\sigma(-1 + 2\cos^2(2\sigma_m)) - \frac{1}{6}B\cos(2\sigma_m)(-3 + 4\sin^2\sigma)(-3 + 4\cos^2(2\sigma_m))\right]\right\}$$

$$s = bA(\sigma - \Delta\sigma)$$

Where:

$\Phi_2$, $\Phi_3$ is the latitude of the points;

$U_1$=arctan [(1−f) tan $\Phi_1$] and $U_2$=arctan [(1−f) tan $\Phi_2$] are the reduced latitude;

$\lambda_2$, $\lambda_3$ are the longitude of the points

L=$\lambda_3$−$\lambda_2$ is the difference in longitude $\alpha_1$, $\alpha_2$ are forward and reverse azimuths;

$\alpha$ is azimuth at the equator (i.e., the great circle/ellipse, or "arc path", the points are on); and s is the ellipsoidal distance between the two points.

The resulting output is an approximation of the ellipsoidal distance s. This output is stored in the computer memory module 171.

18. Calculate aximuth (bearing) of the POI vector. Using solved variables from the previous step 17 to evaluate:

$$\alpha_1 = \arctan\left(\frac{\cos U_2 \sin \lambda}{\cos U_1 \sin U_2 - \sin U_1 \cos U_2 \cos \lambda}\right)$$

$$\alpha_2 = \arctan\left(\frac{\cos U_1 \sin \lambda}{-\sin U_1 \cos U_2 + \cos U_1 \sin U_2 \cos \lambda}\right)$$

Resulting outputs are azimuths $\alpha_1$ *(forward)*, $\alpha_2$ *(reverse)*. These outputs are stored in the computer memory module 171.

19. Approximate the user to POI elevation change: $\Delta Z_2 = Z_3 - Z_2$; POI elevation change ($\Delta Z_2$) is stored in the computer memory module 171.

20. Approximate the incline attributed to the POI vector (See FIG. 7)—Creating a solvable triangle with sides s, |$\Delta Z_2$|, $L_3$:

$$\tan(\theta_3) = \Delta Z_2 / s \rightarrow \theta_3 = \tan^{-1}(\Delta Z_2/s)$$

Note: $\theta_3$ can be positive or negative to reflect incline vs. decline. Inclination of the POI vector ($\theta_3$) is recorded in the computer memory 171.

21. Approximate the real distance (magnitude of the vector) to the POI (See FIG. 7):

$$\text{Distance} \rightarrow L_3 = (s^2 + |\Delta Z_2|^2)^{1/2}$$

Magnitude of POI vector ($L_3$) is stored in the computer memory module 171.

65. With the completion of steps 15 through 21, the attributes of the POI vector have been calculated. The subsequent steps make the updated POI vector, whose attributes were acquired in steps 18-21, available for visual orientation purposes of the user. Each attribute of the POI vector (bearing, inclination, and distance), as well as elevation difference, is retrieved from memory 171 by software via the processor 170 as needed. The third, fourth, and fifth steps of the method are indicated by subroutines 84,85,86 that are described in the dashed boxes 67 in FIG. 1*d*, 70 in FIG. 1*e*, and 83 in FIG. 1*f* respectively. All of these steps—67, 70, & 83—are performed simultaneously in practice, but will be described below as individual processes in numerical order.

84. Bearing orientation, the process of calibrating user gaze in the horizontal plane, is described in this subroutine that flows to FIG. 1*d* before returning.

66. Start of the third step of the method (FIG. 1*d*)—the computer and user interaction process of becoming oriented in the horizontal plane (collectively step 67) is initiated upon completion of the POI vector extrapolation process 64.

Figure 8:
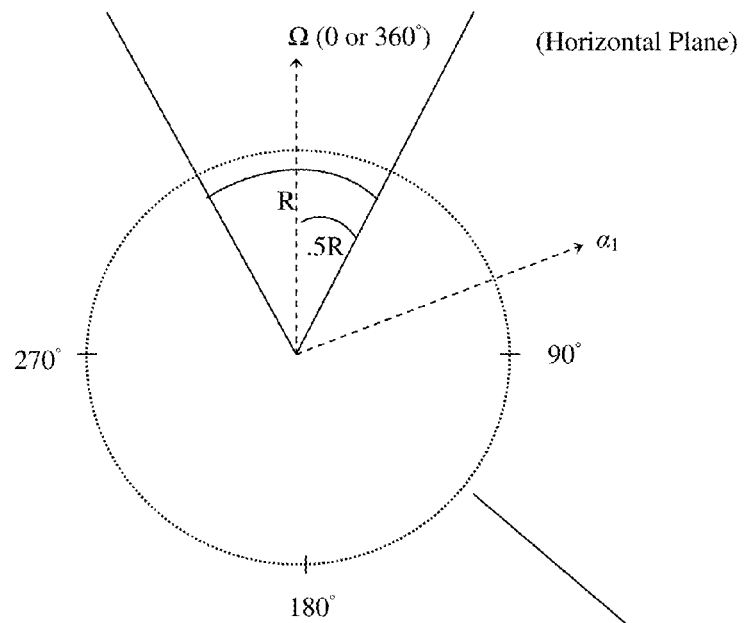
FIG. 8 shows an overhead diagram showing how the POI vector bearing information is considered in the method for orientation purposes.

22. Compare POI bearing ($\alpha_1$) to viewed bearing ($\Omega$):

Before proceeding to the comparison, it is useful to reference FIG. 8—an overhead or perpendicular view of the horizontal plane.

The viewed bearing ($\Omega$) which is the bearing at which the center of the device reticule is aimed at any given time, continually updates as the device pans the horizontal plane 100. The 360 degree plane rotates with $\Omega$ which, as far as this program is concerned, maintains the value of 0 or 360 degrees. In this scenario, the degrees 0-360 occur clockwise from $\Omega$. This program is coded, to make available for visual comparison, the viewed bearing ($\Omega$) versus the bearing to the POI ($\alpha_1$). The two are synchronized against each other in the optoelectronic display 110 and its range of view (R), the number of degrees out of 360 in the horizontal plane that are included within the viewfinder at any given time. This is a constant. 0.5R is the number of degrees between the edge of the field of view and the center of the field of view which is in line of the vertical crosshair 111 of the reticule 141.

Azimuth ($\alpha_1$) is retrieved from the memory module 171 and inputted to a software process as described (See FIG. 9 for optoelectronic display reference):

Note—For horizontal plane orientation, the only items that are visible to the user are indicators 142-146 when activated, and the reticule 141. The horizontal plane reference line 100, and markers 108; 109 in FIG. 9 are purely for illustrative purposes.

Figure 9:
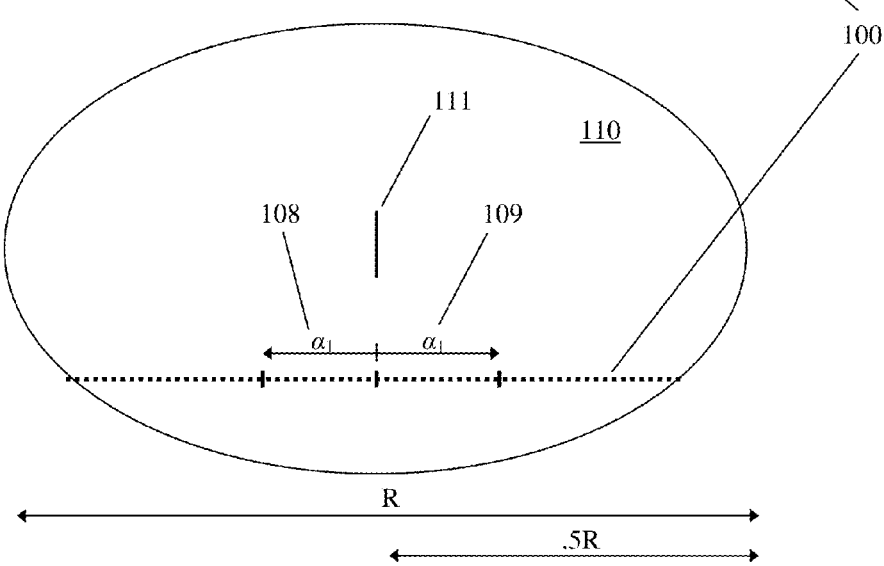
FIG. 9 shows a view through a viewfinder of horizontal POI vector bearing information as it is considered for coordinating use of the pointing indicators

Only one indicator of horizontal orientation may be activated at once—which one is determined by the relative position of $\alpha_1$ versus $\Omega$ (see FIG. 9). Referenced indicators are shown in FIG. 12.

For 180°>$\alpha_1$>0:

142. If 0°+0.5R<$\alpha_1$, then the right arrow indicator is activated, showing that $\alpha_1$ is to the right outside the field of view.

143. If 0°+0.5R>$\alpha_1$, then the indicator representing 0+$\alpha_1$ degrees 109 to the right of $\Omega$ is activated For 360°>$\alpha_1$>180°:

144. If 360°−0.5R>$\alpha_1$, then the left arrow indicator is activated, showing that $\alpha_1$ is to the left outside the field of view.

145. If 360°−0.5R<$\alpha_1$, then the indicator representing 360°−$\alpha_1$ degrees 108 to the left of $\Omega$ is activated.

For $\alpha_1$=$\Omega$ then:

146. The optoelectronic indicator at $\Omega$ (0 or 360 degrees) is activated, showing the POI vector as being down the line of sight of the device reticule 141 in the viewfinder 140.

23. Display in viewfinder—the resulting indicator to be activated is now displayed in the viewfinder 141 in accordance with references 142-146 in FIG. 12.

24. ($\alpha_1$)=($\Omega$)?—Now the user is to interpret the indicator as displayed in the viewfinder. Decision:

25. If $\alpha_1$ does not equal $\Omega$, proceed to 26

26. User physically follows the indicators by panning to the left or right. Now steps 22-26 are reiterated until $\alpha_1$ equals $\Omega$.

27. If $\alpha_1$ does equal $\Omega$, no more horizontal adjustments are necessary; the user is oriented with respect to the POI in this dimension. Proceed to 68.

68. Return—user orientation in the horizontal plane has been achieved, return to FIG. 1*c*.

85. Incline orientation, the process of calibrating user gaze in the vertical plane, is described in this subroutine that flows to FIG. 1*e* before returning.

69. Start of the fourth step of the method (FIG. 1*e*)—the computer and user interaction process of becoming oriented in the vertical plane (collectively step 70) is initiated upon completion of the POI vector extrapolation process 64.

28. Visual incline orientation along the POI incline ($\theta_3$) (See FIG. 10)—[Note* this step is identical to 22 except in the vertical rather than horizontal plane]. Incline ($\theta_3$) is retrieved from the memory module 171 and inputted to a software process as described (See FIG. 11 for optoelectronic reference): The viewed incline ($\beta$), the incline at which the center of the device reticule is aimed at any given time, and continually updates as the device pans the vertical plane 120. The 360 degree plane rotates with $\beta$ which, as far as this program is concerned, maintains the value of 0 or 360 degrees. In this scenario, the degrees 0-360 occur clockwise (downward) from $\beta$. This program is coded, to make available for visual comparison, the viewed incline ($\beta$) versus the incline to the POI ($\theta_3$). The two are synchronized against each other in the optoelectronic display and its range of view ($R_2$), the number of degrees out of 360 in the vertical plane that are included within the viewfinder at any given time. This is a constant. $0.5R_2$ is the number of degrees between the top or bottom of the field of view and the center of the field of view which is level with the horizontal crosshair 122 of the reticule 141.

Note—In vertical plane orientation, the only items that are visible to the user are indicators 147-151 when activated, and the reticule 141. The vertical plane reference line 120, and markers 118; 119 shown in FIG. 11 are purely for conceptual purposes.

Only one indicator of vertical orientation may be activated at once—which one is determined by the relative position of $\theta_3$ versus $\beta$.

For $180° > \theta_3 > 0°$

147. If $0° + 0.5R_2 < \theta_3$, then the downward arrow indicator is activated, showing that $\theta_3$ is downward and outside the field of view.

148. If $0 + 0.5R_2 > \theta_3$, then the indicator representing $0 + \theta_3$ degrees 119 below $\beta$ is activated For $360° > \theta_3 > 180°$ 149. If $360° - 0.5R_2 > \theta_3$, then the upward arrow indicator is activated, showing that $\theta_3$ is to the upward and outside the field of view.

150. If $360° - 0.5R_2 < \theta_3$, then the indicator representing $360° - \theta_3$ degrees 118 above $\beta$ is activated.

For $\theta_3 = \beta$ then:

151. The optoelectronic indicator at $\beta$ (0 or 360 degrees) is activated, showing the POI vector as being along the incline of the device reticule 141 in the device viewfinder 140.

29. Display in viewfinder—the resulting vertical plane indicator to be activated is now displayed in the viewfinder in accordance with references 147-151 in FIG. 11.

30. $\theta_3 = \beta$?—Now the user is to interpret the indicator as displayed in the viewfinder. Decision:

31. If $\theta_3$ does not equal $\beta$, proceed to 32

32. User physically follows the indicators by panning upward or downward as instructed—now steps 28-32 are reiterated until $\theta_3$ equals $\Omega$.

33. If $\theta_3$ equals $\Omega$, no more vertical adjustments are necessary, the user is oriented with respect to the POI in the vertical dimension. Proceed to 81.

81. Return—visual orientation in the vertical plane is achieved, return to FIG. 1c.

86. The process of calibrating user gaze to distance, elevation difference, and alternate informatica, is described in this subroutine that flows to FIG. 1f before returning.

82. Start of the fifth step of the method (FIG. 1f)—the computer process of becoming oriented with static information including distance, elevation discrepancy, and alternate information (collectively step 83) is initiated upon completion of the POI vector extrapolation process 64.

34. Distance visual orientation [the magnitude of the POI vector ($L_3$)] (See FIG. 12)—Distance ($L_3$) is retrieved from computer memory 171 and is displayed 142 in the viewfinder 140 for comprehension by user depth perception. The referenced distance number, 783, is purely illustrative, showing in this example that the POI vector is 783 yards in length. As the user observes along POI vector, $L_3$ indicates how far in that direction the POI lies.

35. Elevation discrepancy orientation (See FIG. 12)—The elevation discrepancy ($\Delta Z_2$) is retrieved from the computer memory 171 and displayed 153 in the viewfinder 140. As the user observes the POI vector, $\Delta Z_2$ indicates how much higher or lower in elevation the POI lies relative to their current position. In this case, for illustration purposes only, $\Delta Z_2$ equals −62, meaning that the POI is 62 feet lower in elevation. This information is useful for strategic maneuvering purposes.

36. Display alternative information in the viewfinder 140—a multitude of alternative information may also be displayed 154. For example temperature, or humidity that are acquired by alternatively embodied instruments 175 may be retrieved from computer memory 171 for display. Additionally, time of day recorded by the digital clock 173 or true bearing acquired by the compass 162 might be shown. Information provided from an external supportive device can also be included. For example, Overland Distance, or the true distance a user will hike to a POI, found by calculating distance along the curvature of a topographical path, can also be displayed 154 as an alternative bit of information. There are multitudes of other information types that can be useful and displayed.

337. Return—visual orientation for distance, relative elevation, and alternative informatica has been achieved. Return to FIG. 1c and proceed through connector D to complete the method loop back to step 14 in FIG. 1b.

With the completion of the simultaneous $3^{rd}$, $4^{th}$, and $5^{th}$ method steps (67,70, and 83 respectively) the method has come to an end. The User now looks directly along the POI vector (See FIG. 12) where their gaze has been calibrated with the distance 152, elevation change 153, azimuth or compass bearing 146, and inclination 151 to the POI—All of which are displayed simultaneously in the viewfinder 140 and reconcile to the reticule 141.

Having walked through the method in full, it is prudent to re-visit the example scenario depicted in FIG. 5a, this time referencing the user-viewed results of the system and method in its most basic functionality (FIGS. 5b-5f).

Figure 5B:
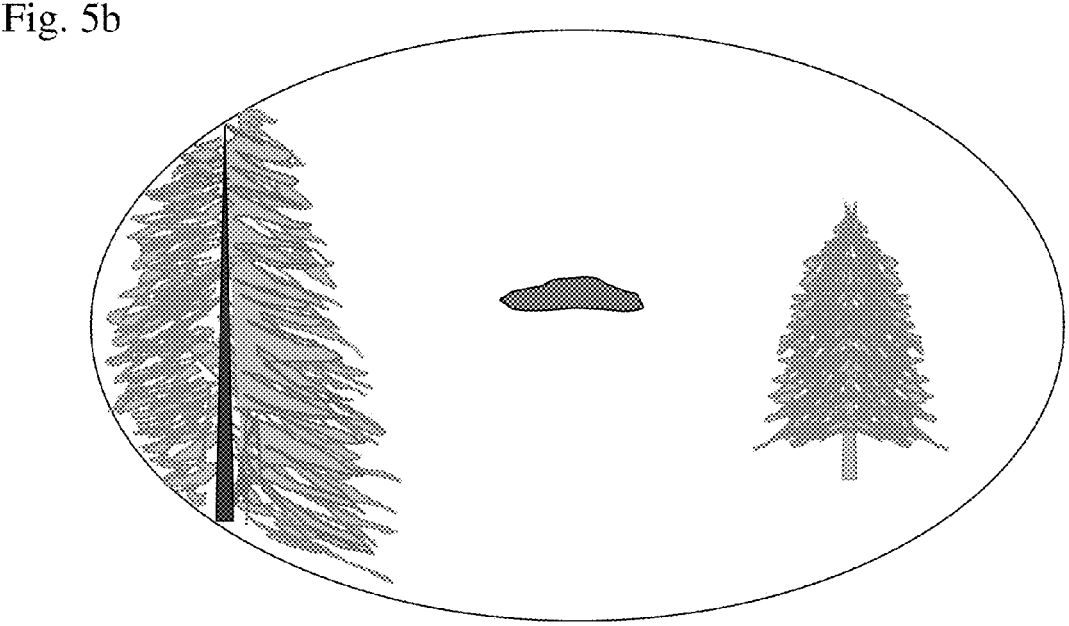
FIGS. 5b-5f show first person user perspectives through the device while moving with respect to a POI.

In Phase 1 the user 57 located at point 58 notices the large rock 55 and designates the object a POI (see FIG. 5b for user view). Using the buttons or voice recognition as user interface 172, the user selects the POI designation function from the electronic menu displayed in the viewfinder.

Figure 5C:
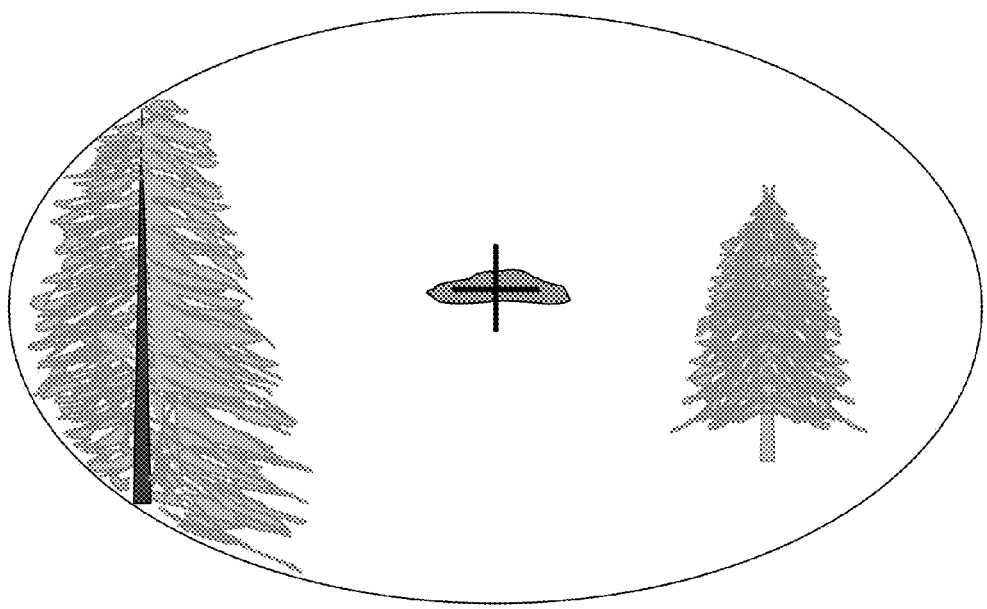
Figure 5D:
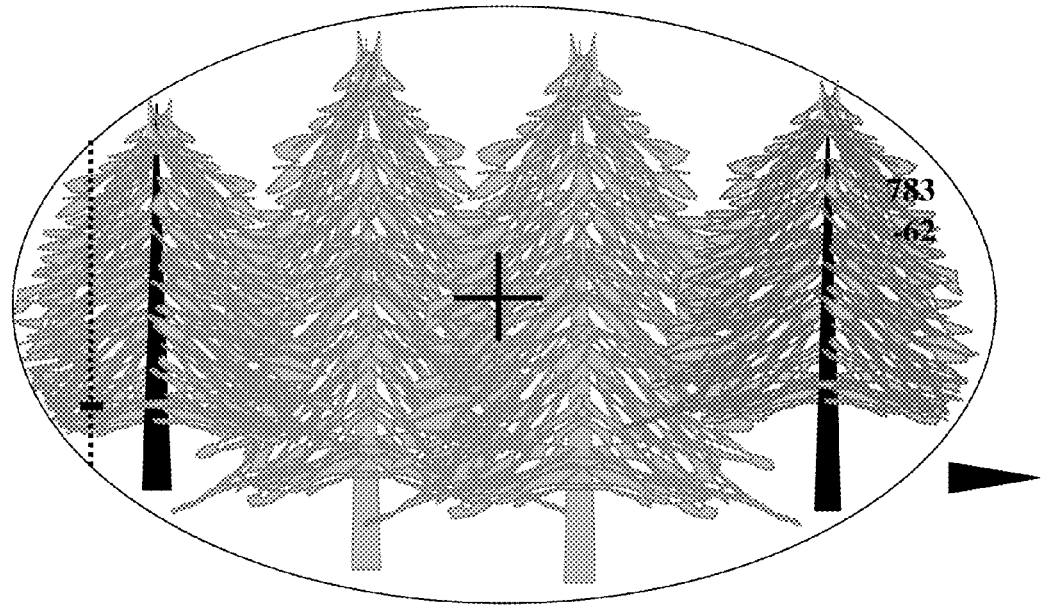
Figure 5E:
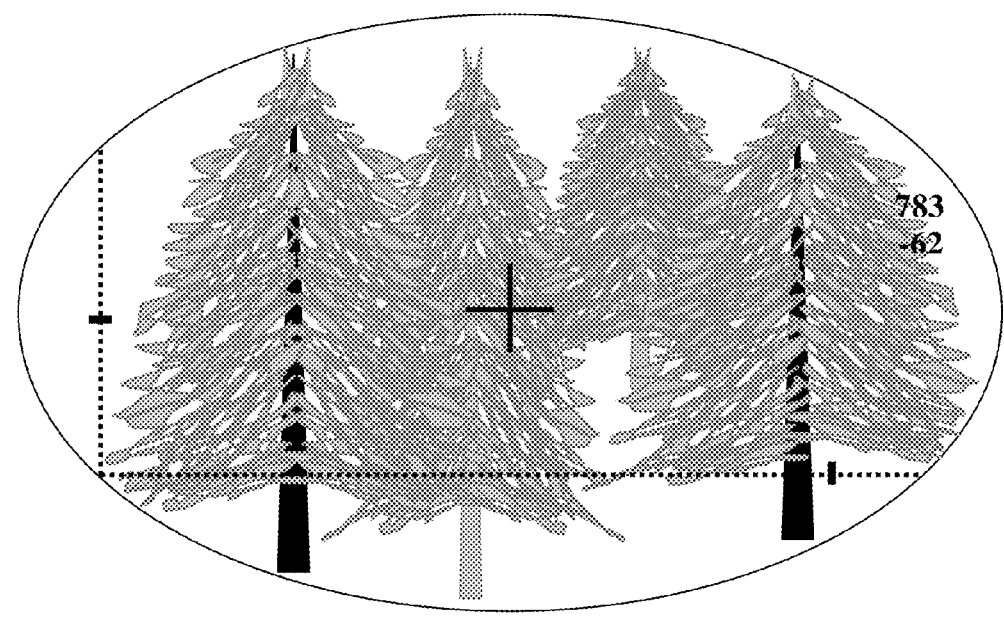
Figure 5F:
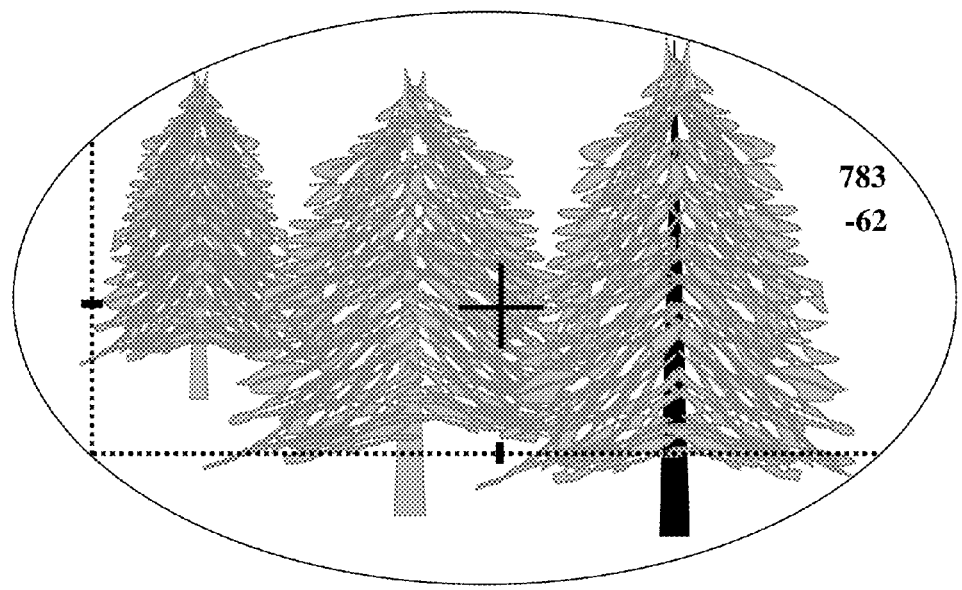
Figure 6:
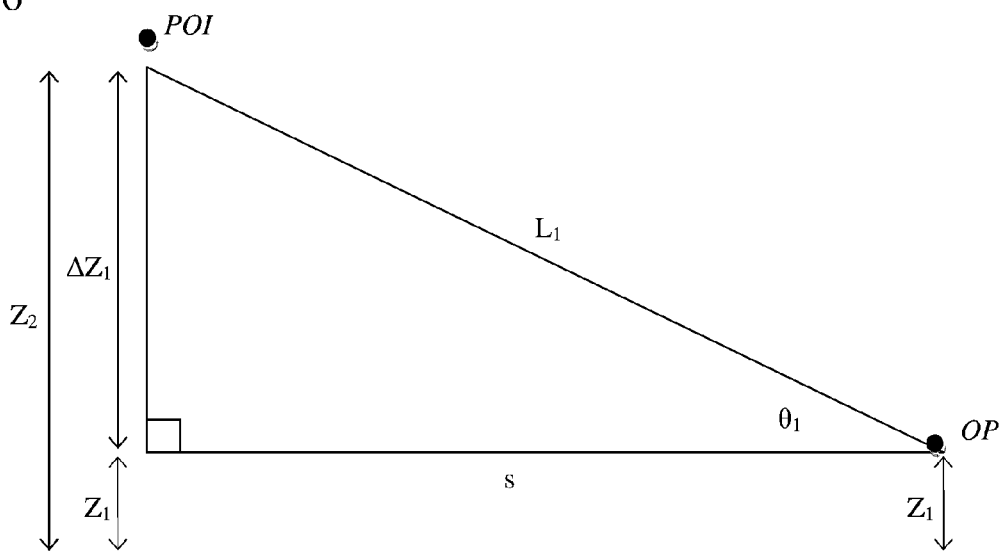
FIG. 6 shows a diagram of the POI vector and the mathematical figures and variables required to extrapolate the ellipsoidal distance to the POI; the POI's elevation; and then the POI coordinates.
Figure 7:
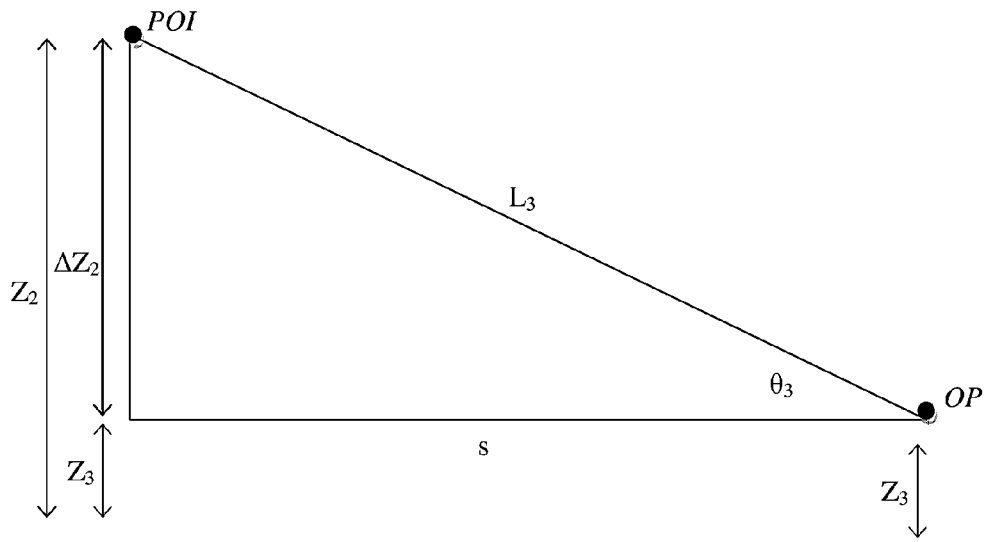
FIG. 7 shows a diagram of the POI vector and the mathematical figures and variables required to extrapolate the real distance to the POI and the inclination to the POI.

Next the user aims the reticule 141 at the rock by viewing along the current POI vector 60, thus committing the rock's position information to the device's memory 171 (see FIG. 5c for user view).

Reassured that the objective POI coordinates will not be lost, the user maneuvers along desired path 62 before reaching point 59. The user, wishing to re-orient with regard to the rock and traverse towards it, enters Phase 2.

Looking around he realizes that the landscape has changed, many trees 56 now obstruct his view, and he cannot be certain of a direct path toward his goal. Consequently, the user wishes to construct an updated POI vector.

For the purpose, the invented system and method are again consulted, this time the POI vector recreation function is selected and the device is re-activated to extrapolate the POI vector (steps 15-37).

Now, looking through the device, the user is pointed in the direction of the POI vector (see FIG. 5*d* for user view)—by interacting with the indicators, he knows the POI is slightly downward of the current aiming point, but out of view to his right. Guided by the indicators, the user directs his gaze downward and to the right. He now finds that the vertical indicator shows that he is oriented in the vertical plane, however he must continue panning to the right, since the horizontal indicator is still right of center, although now within the view of the device (see FIG. 5*e* for user view). The user continues to pan to the right, bringing the horizontal indicator in line with the vertical crosshair of the reticle (see FIG. 5*f* for user view).

Now, although the user cannot see the rock, he is looking directly along the POI vector towards it, and knows the rock lies 783 yards directly ahead and is 62 feet lower in elevation. Although the user cannot see the rock, he now knows where it lies, relative to his current position 59. By using this knowledge, and reiterating the vector reconstruction as necessary, the user is able to traverse 61 through the confounding maze of trees, until successfully arriving at the destination rock POI 55.

Figure 2A:
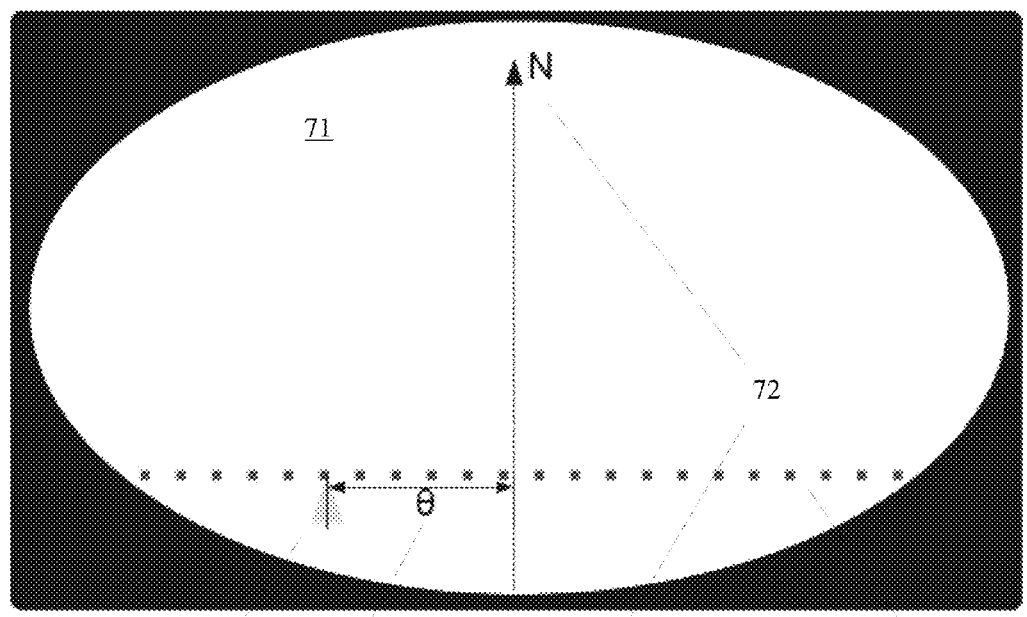
FIGS. 2a and 2b show the method output in the horizontal plane, more specifically in the event the POI vector lies within the field of view theta degrees to the left of center.
Figure 2B:
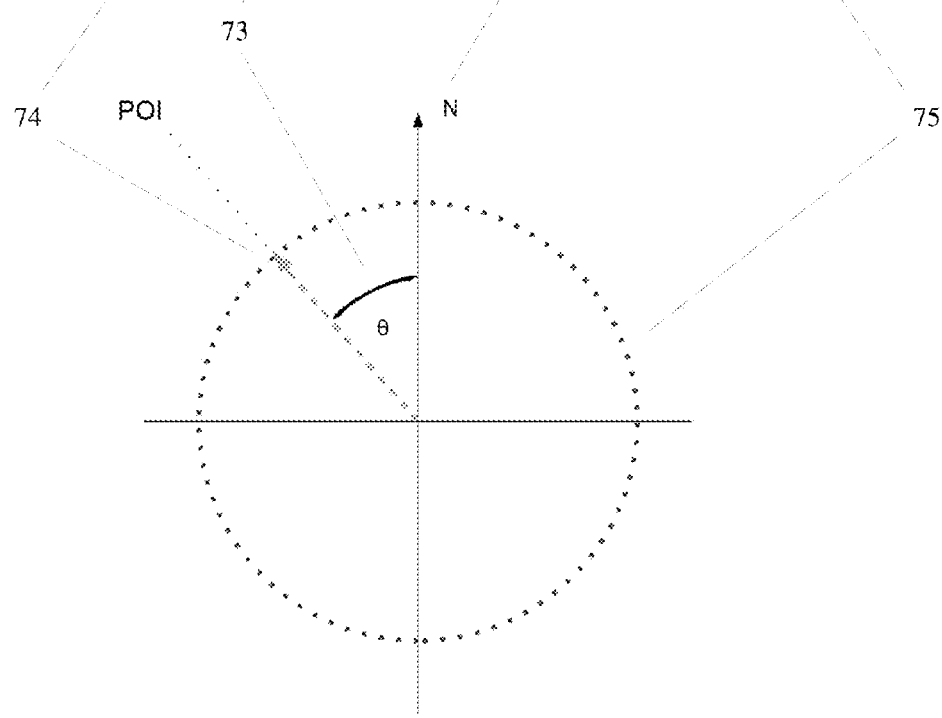

FIGS. 2*a* and 2*b* illustrate how the horizontal outputs of methods outlined in the preceding steps, specifically a bearing (or azimuth) θ73 assigned to the POI vector, is made useful to the user for visual orientation in the viewfinder 71; where, FIG. 2*a* is seen through the viewfinder which is embedded in the horizontal plane 75, and, FIG. 2*b* is an overhead perspective, or perpendicular view of the horizontal plane.

The indicated bearing is measured from the vertical center of the viewfinder 72, which for illustrative purposes takes on the value of true north, in this depiction. The bearing along the horizon 73 is depicted with a marker 74 against the observed landscape indicating where the POI lies in the horizontal plane.

Figure 3A:
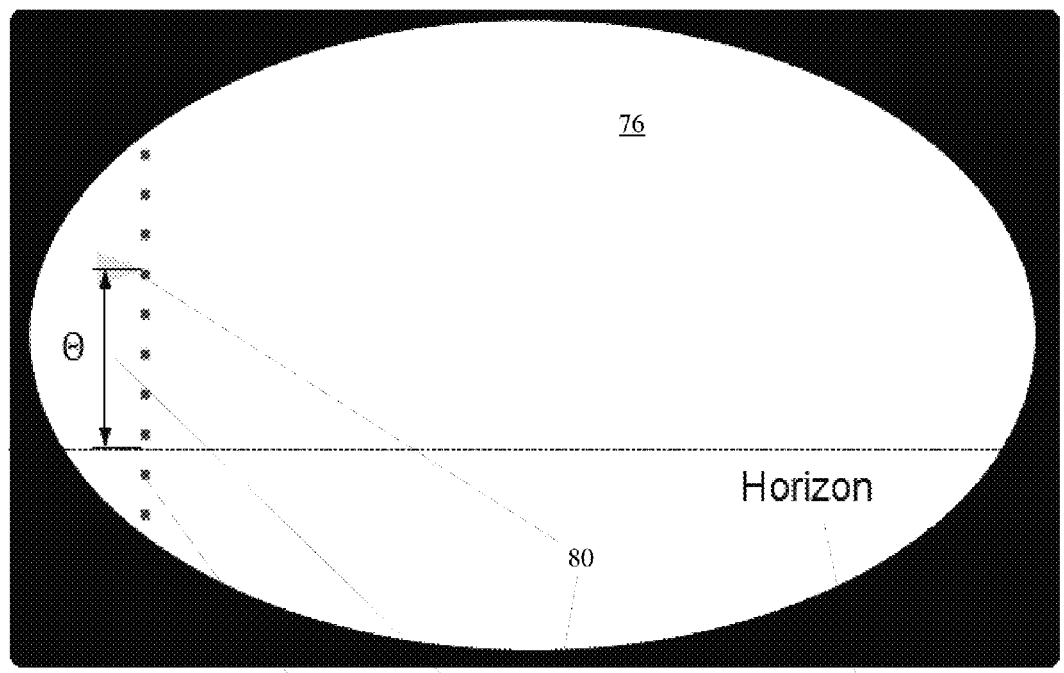
FIGS. 3a and 3b show the method output in the vertical plane, more specifically in the event the POI vector lies within the field of view theta degrees upward from center.
Figure 3B:
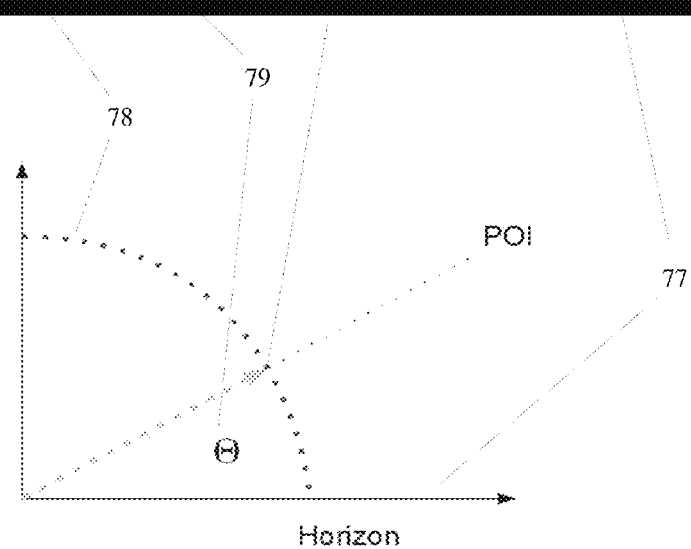

FIGS. 3*a* and 3*b* illustrate how the inclination (vertical plane) output calculated in the vector reconstructing method is utilized in the viewfinder 76. FIG. 3*a* shows an "in plane view" through the viewfinder, while FIG. 3*b* illustrates the same concept from a side view, or perpendicular to FIG. 3*a*. The angle Θ79 above or below the horizon 77 is depicted with a marker 80 against the observed landscape indicating the incline to the POI as it lies in the vertical plane 78.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

GLOSSARY OF TERMS

Altimeter: is an instrument used to measure the elevation of an object above a fixed level, in this case, sea level.
Art: refers to the categorical use of the invented system and methods in accordance to the common use of "art" when discussing intellectual property, i.e. "prior art". In this case the "Art" is that of an outdoorsman, where the invention is used in assistance of the objectives of outdoors enthusiasts such as hunters, hikers, field biologists, Division of Wildlife officers, etc. who frequently rely on familiarity and visually acquired landmarks to traverse a wilderness setting.
Blue-tooth: is an open standard for short-range radio transmission for data synchronization between computers and/or computer-based devices.
Computer Memory: is the place in a computer where the operating system, application programs, and data in current use are kept so that they can be quickly reached by the computer's processor.
Computer Processor: is the logic circuitry that responds to and processes the basic instructions that drive a computer.
GPS Receiver: receives a signal from a constellation of Earth-orbiting satellites. The U.S. military developed and implemented this satellite network as a military navigation system, but it was made available for civilian navigation. GPS provides global coordinates to the receiver at any position on earth.
Inclinometer: is an instrument that measures the angle it is pointing above or below a designated horizon plane.
Optoelectronic Display: operating hardware that converts electrical signals to a user-visible display.
Orientation Device & System (ODS): refers to the invention disclosed in this document, a method and device for remotely identifying and recording a POI's coordinates in three dimensional space and providing relative visual orientation with regard to the POI as the user's current position while maneuvering.
Point of Interest (POI): refers to a point in three dimensional space, desired as a destination, that is recorded and tracked by the ODS.
Three-Axis Tilt Compensating Compass: is an electronic compass which, regardless the angle at which its held, orients itself to know which way is up and which way is north.

What is claimed is:

1. A visual orientation device, comprising:
a) a processor having an associated memory for storing programs and data, at least one output, and a plurality of inputs;
b) an optical instrument comprising:
  i) an optic module having a viewing vector along which an image passes through the optic module to a user;
  ii) a viewfinder display coupled to an output of the processor, displaying a plurality of indicia to the user under control of the processor, in proximity to a reticle on the viewfinder display having a center indicating the viewing vector of the optic module;
c) a compass having an output for azimuth data coupled to an input of the processor, such that the output of the compass provides the processor with data representing a compass bearing of the viewing vector, the data representing the compass bearing of the viewing vector being stored by the processor in the memory associated with the processor;
d) an inclinometer having an output coupled to an input of the processor, such that the output of the inclinometer provides the processor with data representing an angle of inclination of the viewing vector relative to gravity, the data representing the angle of inclination of the viewing vector relative to gravity being stored by the processor in the memory associated with the processor;
e) a rangefinder, having a laser for measuring a distance between the visual orientation device and a point of interest (POI) aligned with the center of the reticle of the viewfinder display; and an output coupled to an input of the processor, such that the output of the rangefinder provides the processor with data representing the distance between the point of interest (POI) and the visual orientation device, the data representing the distance between the point of interest (POI) and the visual orientation device being stored by the processor in the memory associated with the processor;

f) a GPS receiver having an output coupled to an input of the processor, such that the output of the GPS receiver provides the processor with data representing at least a current latitude and longitude of the visual orientation device, the data representing at least a current latitude of the visual orientation device and a current longitude of the visual orientation device being stored by the processor in the memory associated with the processor;

g) a user interface having at least an output coupled to the processor, such that the user can input commands to the processor; and h) executable computer code stored in the memory associated with the processor, the executable code comprising algorithms for solving Vincenty's direct method and Vincenty's inverse method;

wherein:

when the visual orientation device is at a first location and a user aligns the point of interest with the center of the reticle of the viewfinder display, the processor receives an altitude of the first location, a first latitude and a first longitude from the GPS receiver, a bearing from the visual orientation device to the point of interest from the compass, a distance between the point of interest and the first location from the rangefinder, an angle of inclination of the viewing vector relative to gravity from the inclinometer at the first location; and the processor executes the code including algorithms solving Vincenty's direct method to determine and store in the memory associated with the processor a latitude of the point of interest, a longitude of the point of interest, and the altitude of the point of interest; and when the visual orientation device is at a second location, the processor receives an altitude of the second location, a second latitude and a second longitude from the GPS receiver; and the processor executes the code solving Vincenty's inverse method to calculate a POI vector from the second location to the point of interest, a horizontal deviation and a vertical deviation between the POI vector and the viewing vector of the visual orientation device; and, the processor displays indicia on the viewfinder display, the indicia having positions relative to the center of the reticle on the viewfinder display representing a relative horizontal deviation and a relative vertical deviation between the viewing vector of the visual orientation device at the second location and the POI vector.

2. The visual orientation device of claim 1, further comprising an altimeter having an output coupled to an input of the processor, such that the output of the altimeter provides the processor with data representing an altitude of the visual orientation device, the data representing the altitude of the visual orientation device being stored by the processor in the memory associated with the processor.

3. The visual orientation device of claim 1, further comprising a data transceiver having an input coupled to an output of the processor and an output coupled to an input of the processor, such that the processor can send and receive data through the transceiver.

4. The visual orientation device of claim 1, further comprising an external display having an input coupled to an output of the processor, for displaying data to the user external to the device and separate from the viewfinder.

5. The visual orientation device of claim 1, further comprising a digital clock having an output coupled to an input of the processor, such that the processor can obtain time stamp data from the clock.

6. The visual orientation device of claim 1, in which the GPS receiver further provides the processor with time stamp data from GPS satellite time data encoded in a GPS signal received by the GPS receiver.

7. The visual orientation device of claim 1, further comprising an environmental sensor having an output coupled to the processor.

8. The visual orientation device of claim 1, in which the optic module is a binocular.

9. The visual orientation device of claim 1, in which the optic module is a monocular.

10. The visual orientation device of claim 1, in which the GPS receiver output also provides the processor with altitude data.

11. A method of navigation using visual orientation from a first location to a point of interest, using a visual orientation device comprising a processor having associated memory for storing programs and data, at least one output, and a plurality of inputs; an optical instrument comprising an optic module having a viewing vector along which an image passes through the optic module to a user; a viewfinder display coupled to an output of the processor, displaying a plurality of indicia to the user under control of the processor, in proximity to a reticle displayed in a center of the viewfinder display, with the center of the reticle indicating the viewing vector of the visual orientation device; a compass having an output for azimuth data coupled to an input of the processor, such that the output of the compass provides the processor and memory associated with the processor with data representing a compass bearing of the viewing vector; an inclinometer having an output coupled to an input of the processor, such that the output of the inclinometer provides the processor and the memory associated with the processor with data representing an angle of inclination of the viewing vector relative to gravity; a rangefinder, having a laser for measuring a distance between a point of interest intersecting the viewing vector of the visual orientation device, and an output coupled to an input of the processor, such that the output of the rangefinder provides the processor and the memory associated with the processor with data representing a distance between the visual orientation device and the point of interest; a GPS receiver having an output coupled to an input of the processor, such that the output of the GPS receiver provides the processor and the memory associated with the processor with data representing at least a latitude and a longitude of a current location of the visual orientation device; executable computer code stored in a memory associated with the processor, the executable code comprising algorithms for solving Vincenty's direct method and Vincenty's inverse method using data provided to the processor; and a user interface having at least an output coupled to the processor, such that the user can input commands to the processor, the method comprising:

a) registering a first location of the visual orientation device by reading at least a first latitude and a first longitude from the output of the GPS receiver, obtaining a first altitude;

b) looking through the visual orientation device view finder and aligning the viewing vector of the visual orientation device with the point of interest, such that the point of interest is viewed coincident with the center of the reticle of the visual orientation device, and, while the viewing vector of the visual orientation device is aligned with the point of interest:
  i) using the rangefinder to measure a first distance between the visual orientation device and the point of interest;
  ii) using the inclinometer to measure a first inclination of the viewing vector of the visual orientation device;
  iii) using the compass to measure a first compass bearing from the visual orientation device to the point of interest;
c) calculating coordinates of the point of interest by:
  i) approximating an ellipsoidal distance between the first location of the visual orientation device and the point of interest;
  ii) calculating an altitude of the point of interest from the first altitude, the first inclination, and the distance between the first location of the visual orientation device and the point of interest, and storing the altitude of the point of interest in memory; and
  iii) using executable code in the processor for solving Vincenty's direct method to extrapolate a latitude of the point of interest and a longitude of the point of interest from the first latitude and the first longitude, the first compass bearing, and the ellipsoidal distance between the first location of the visual orientation device and the point of interest, and storing the latitude of the point of interest and the longitude of the point of interest in memory associated with the processor;
d) moving the visual orientation device to a second location and acquiring a second latitude and a second longitude by reading the output of the GPS receiver, and obtaining a second altitude;
e) calculating a POI vector connecting the second latitude, the second longitude, and the second altitude with the latitude of the point of interest, the longitude of the point of interest, and the altitude of the point of interest, the POI vector comprising a magnitude, an azimuth, and an inclination;
f) looking through the viewfinder of the visual orientation device; while the processor uses the POI vector, the second inclination from the inclinometer, and the second compass bearing from the compass to compare the POI vector with the viewing vector of the visual orientation device and calculate a horizontal deviation and a vertical deviation between the viewing vector of the visual orientation device and the POI vector;
g) displaying indicia on the viewfinder display, such that a position of the indicia on the viewfinder display relative to the center of the reticle on the viewfinder display represents a relative horizontal deviation and a relative vertical deviation between the viewing vector of the visual orientation device and the POI vector on the viewfinder;
h) repeating the method steps f) and g) while adjusting an orientation of the visual orientation device until the indicia displayed on the viewfinder display move to the center of the reticle.

12. The method of claim 11, in which the GPS receiver output also provides the processor and the memory associated with the processor with altitude data, and in steps (a) and (d), the first altitude and the second altitude are obtained from the output of the GPS receiver.

13. The method of claim 11, in which the visual orientation device further comprises an altimeter having an output coupled to an input of the processor, such that the output of the altimeter provides the processor and the memory associated with the processor with data representing an altitude of the visual orientation device and in steps (a) and (d) the first altitude and second altitude are obtained from the output of the altimeter.

14. The method of claim 11, in which step (e) of calculating the POI vector comprises the steps of:
  i) approximating an ellipsoidal distance between the second location of the visual orientation device and the point of interest using executable code in the processor for solving Vincenty's inverse method, the latitude of the point of interest, the longitude of the point of interest, the second latitude of the visual orientation device, and the second longitude of the visual orientation device;
  ii) determining a second bearing from the second location of the visual orientation device to the point of interest using executable code in the processor for solving Vincenty's inverse method, the latitude of the point of interest, the longitude of the point of interest, the second latitude of the visual orientation device, and the second longitude of the visual orientation device;
  iii) approximating a change in altitude between the second altitude and the altitude of the point of interest;
  iv) approximating an inclination from the second location of the visual orientation device to the point of interest from the change in altitude calculated in step iii); and
  v) approximating a real distance from the second location of the visual orientation device to the point of interest from the ellipsoidal distance approximated in step i) and the change in altitude calculated in step iii).

15. The method of claim 11, in which the viewing vector is determined in step (f) from bearing data from the compass and inclination data from the inclinometer.

16. The method of claim 11, in which step (a) of registering a first location of the visual orientation device is performed based on an input from the user interface.

17. The method of claim 11, in which steps (b) and (c) are performed based on an input from the user interface.

18. The method of claim 11, in which step (h) of repeating the method is performed based on an input from the user interface.

* * * * *